(12) United States Patent
Smith et al.

(10) Patent No.: US 7,143,586 B2
(45) Date of Patent: *Dec. 5, 2006

(54) THERMOACOUSTIC DEVICE

(75) Inventors: Robert W. M. Smith, State College, PA (US); Matthew E. Poese, State College, PA (US); Ray S. Wakeland, Muncie, IN (US); Steven L. Garrett, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 322 days.

This patent is subject to a terminal disclaimer.

(21) Appl. No.: 10/791,497

(22) Filed: Mar. 2, 2004

(65) Prior Publication Data

US 2005/0274123 A1 Dec. 15, 2005

Related U.S. Application Data

(63) Continuation of application No. 10/410,492, filed on Apr. 9, 2003, now Pat. No. 6,725,670.

(60) Provisional application No. 60/445,866, filed on Feb. 6, 2003, provisional application No. 60/372,008, filed on Apr. 10, 2002, provisional application No. 60/371,967, filed on Apr. 10, 2002.

(51) Int. Cl.
*F25B 9/00* (2006.01)

(52) U.S. Cl. ............................................... 62/6
(58) Field of Classification Search ............... 62/6
See application file for complete search history.

(56) References Cited

U.S. PATENT DOCUMENTS

| | | |
|---|---|---|
| 2,549,464 A | 4/1951 | Hartley |
| 2,836,033 A | 5/1958 | Marrison |
| 3,513,659 A | 5/1970 | Martini .............................. 62/6 |
| 3,548,589 A | 12/1970 | Cooke-Yarborough .......... 60/24 |
| 3,604,821 A | 9/1971 | Martini et al. ............... 417/379 |
| 3,991,585 A | 11/1976 | Mulder ............................. 62/6 |
| 4,036,018 A | 7/1977 | Beale |
| RE29,518 E | 1/1978 | Franklin ....................... 60/520 |
| 4,114,380 A | 9/1978 | Ceperley |
| RE30,176 E | 12/1979 | Beale ........................... 60/520 |
| 4,355,517 A | 10/1982 | Ceperley |
| 4,398,398 A | 8/1983 | Wheatley et al. |
| 4,450,685 A | 5/1984 | Corey .......................... 60/520 |
| 4,489,553 A | 12/1984 | Wheatley et al. |
| 4,490,983 A | 1/1985 | Gifford et al. |
| 4,599,551 A | 7/1986 | Wheatley et al. |
| 4,625,517 A | 12/1986 | Miller |
| 4,686,407 A | 8/1987 | Ceperley |
| 4,722,201 A | 2/1988 | Hofler et al. |
| 4,858,441 A | 8/1989 | Wheatley et al. |
| 4,858,717 A | 8/1989 | Trinh et al. |
| 4,953,366 A | 9/1990 | Swift et al. |
| 5,165,243 A | 11/1992 | Bennett |
| 5,174,130 A | 12/1992 | Lucas |
| 5,269,147 A | 12/1993 | Ishizaki et al. |
| 5,295,355 A | 3/1994 | Zhou et al. |
| 5,303,555 A | 4/1994 | Chrysler et al. |
| 5,319,938 A | 6/1994 | Lucas |
| 5,339,640 A | 8/1994 | Reinke |
| 5,357,757 A | 10/1994 | Lucas |
| 5,369,625 A | 11/1994 | Gabrielson .................. 367/140 |
| 5,389,844 A | 2/1995 | Yarr et al. |
| 5,456,082 A | 10/1995 | Keolian et al. |
| 5,502,968 A | 4/1996 | Beale |
| 5,515,684 A | 5/1996 | Lucas et al. |
| 5,647,216 A | 7/1997 | Garrett |
| 5,673,561 A | 10/1997 | Moss |
| 5,701,743 A | 12/1997 | Hagiwara et al. |
| 5,813,234 A | 9/1998 | Wighard |
| 5,857,340 A | 1/1999 | Garrett |
| 5,901,556 A | 5/1999 | Hofler |
| 5,953,920 A | 9/1999 | Swift et al. |
| 5,953,921 A | 9/1999 | Garrett |
| 5,996,345 A | 12/1999 | Hofler |
| 6,032,464 A | 3/2000 | Swift et al. |
| 6,059,020 A | 5/2000 | Jairazbhoy et al. |
| 6,079,214 A | 6/2000 | Bishop |
| 6,145,320 A | 11/2000 | Kim |
| 6,233,946 B1 | 5/2001 | Masuda |
| 6,307,287 B1 | 10/2001 | Garrett et al. |
| 6,314,740 B1 | 11/2001 | De Bloc et al. |

| | | | |
|---|---|---|---|
| 6,385,972 | B1 | 5/2002 | Fellows |
| 6,490,881 | B1 | 12/2002 | Sinclair et al. |
| 6,725,670 | B1 | 4/2004 | Smith et al. ............... 62/6 |
| 2001/0025494 | A1 | 10/2001 | Sinclair et al. |
| 2002/0166325 | A1 | 11/2002 | Corey |
| 2002/0178736 | A1 | 12/2002 | Corey et al. |

FOREIGN PATENT DOCUMENTS

| | | |
|---|---|---|
| EP | 0614059 A1 | 3/1994 |
| EP | 0678715 A1 | 4/1994 |
| GB | 2237866 | 10/1990 |
| WO | WO02/087279 A2 | 10/2002 |

OTHER PUBLICATIONS

Garrett, Steven, "ThermoAcoustic Life Sciences Refrigerator," Oct. 30, 1991, pp. 4-43.
Ceperley, Peter H., "A pistonless Stirling engine—The traveling wave heat engine," J. Acoust. Soc. Am, 66 (55), Nov. 1979, pp. 1508-1513.
Gedeon, David, "DC Gas Flows in Stirling and Pulse Tube Cryocoolers," Cryocoolers 9, Edited by R.G. Ross, Jr., Plenum Press, NY, 1997, pp. 385-392.
Wakelane, Ray Scott, "Use of Electrodynamic Drivers in Thermoacoustic Refrigerators," J. Acoust. Soc. Am. 107(2), Feb. 2000, pp. 827-832.
Swift, G.W., Ward, W.C., "Simple Harmonic Analysis of Regenerators," Journal of Thermophysics and Heat Transfer, vol. 10, No. 4, Oct.-Dec. 1996, pp. 652-662.
Garrett, S., Perkins, D., Gopinath, A., "ThermoAcoustic Refrigerator Heat Exchangers: Design, Analysis and Fabrication," Physics Dept.—Code PH/Gx, Naval Postgraduate School, Monteray, CA, pp. 375-379.
Swift, G., Migliori, A., Wheatley, J., "Liquid Metal Thermoacoustic Engine," Condensed Matter and Thermal Physics Group, Los Alamos National Laboratory, Los Alamos, NM.
Swift, G., "Analysis and Performance of a Large Thermoacoustic Engine," J. Acoust. Soc. Am. 92(3), Sep. 1992, pp. 1551-1563.
Swift, G., "Thermoacoustic Engines and Refrigerators," Physics Today, Jul. 1995, pp. 22-28.
Swift, G., "Thermoacoustic Engines," Journal of Acoustical Society of America 84(4), Jul. 1988, pp. 1145-1180.
Garrett, S., Adeff, J., Hofler, T., "Thermoacoustic Refrigerator for Space Applications," Journal of Thermophysics and Heat Transfer, vol. 7, No. 4, Oct.-Dec. 1993, pp. 595-599.
Backhaus S., Swift, G., "A Thermoacoustic Stirling Heat Engine," Nature, vol. 399, May 27, 1999, www.nature.com, pp. 335-338.
Garrett, S., "Revinventing the Engine," Nature, vol. 399, May 27, 1999, www.nature.com, pp. 303-305.
Backhaus, S., Swift, G., "New Varieties of Thermoacoustic Engines," Condensed Matter and Thermal Phsyics Group, Los Alamos National Laboratory, Los Alamos, NM, Jul. 2002, pp. 1-8.
Backhaus, S., Swift, G., "A Thermoacoustic-Stirling Heat Engine: Detailed Study," J. Acoust. Soc. Am. 107(6), Jun. 2000, pp. 3148-3166.
Backhaus S., Swift, G., "Fabrication and Use of Parallel Plate Regenerators in Thermoacoustic Engines," Proceedings of IECEC '01, 36th Intersociety Energy Conversion Engineering Conference, Jul. 29-Aug. 2, 2001, Savannah, GA, pp. 1-5.

Wakeland, R., Garrett, S., "Lessons From a Thermoacoustic Refrigeration Demonstration Device," The Pennsylvania State University Applied Research Laboratory, Technical Report No. TR 98-005, Dec. 1998, pp. 1-117.
Swift, G., Gardner, D., Backhaus, S., "Acoustic Recovery of Lost Power in Pulse Tube Refrigerators," J. Acoust. Soc, Am. 105(2), Pt. 1, Feb. 1999, pp. 711-724.
Gardner, D. Swift G., "Use of Inertance in Orifice Pulse Tube Refrigerators," Cryogenics 37 (1997), 1997 Elsevier Science Limited, pp. 117-121.

*Primary Examiner*—William C. Doerrler
(74) *Attorney, Agent, or Firm*—Gifford, Krass, Groh, Sprinkle, Anderson & Citkowski, P.C.

(57) ABSTRACT

A thermocoustic device includes a housing with a thermal core supported in the housing and having a first and a second surface. The thermal core includes a first heat exchanger defining the first surface of the thermal core and a second heat exchanger defining the second surface of the thermal core. A main chamber is in fluid communication with the first surface of the thermal core and a secondary multiplier chamber is in fluid communication with the second surface of the thermal core. A working volume of a gaseous working fluid fills the main chamber, the multiplier chamber, and the thermal core at a pressure. An equilibrium pressure is defined as the pressure of the working volume of gaseous working fluids with the thermoacoustic device is in a non-operating mode. The main chamber includes a first oscillating member that is operable when the thermoacoustic device is in an operating mode to oscillate such that the pressure in both the main chamber and in the multiplier chamber is oscillated between a peak pressure greater than the equilibrium pressure and a minimum pressure less than the equilibrium pressure. A main pressure amplitude is defined as one-half of the difference between the peak pressure and the minimum pressure in the main chamber. The secondary multiplier chamber includes a second oscillating member that is operable when the thermoacoustic device is in the operating mode to oscillate such that the pressure in the multiplier chamber is oscillated between a peak pressure greater than the equilibrium pressure and a minimum pressure less than the equilibrium pressure. A multiplier pressure amplitude is defined as one-half of the difference between the peak pressure and the minimum pressure in the multiplier chamber. The first and second oscillating members oscillate at substantially the same frequency and such that the pressure oscillations in the main chamber and the multiplier chamber are substantially in phase with each other. The multiplier pressure amplitude is greater than the main pressure amplitude.

20 Claims, 14 Drawing Sheets

THERMOACOUSTIC DEVICE

REFERENCE TO RELATED APPLICATIONS

This patent application is a continuation of U.S. patent application Ser. No. 10/410,492, filed Apr. 9, 2003 now U.S. Pat. No. 6,725,670, which claims benefit from U.S. provisional patent application Ser. Nos. 60/372,008, filed Apr. 10, 2002; 60/371,967, filed Apr. 10, 2002; and 60/445,866, filed Feb. 6, 2003, the contents of all of which are incorporated in their entirety herein by reference.

FIELD OF THE INVENTION

The present invention relates generally to thermoacoustic devices and, more specifically, to thermoacoustic engines and refrigeration pumps. However, the present invention has applicability outside the field of thermoacoustics, and is therefore not limited to thermoacoustic devices.

BACKGROUND OF THE INVENTION

During the past two decades, there has been an increasing interest in the development of thermoacoustical cooling engines (pumps) for a variety of commercial, military and industrial applications. Interest in thermoacoustic cooling has accelerated rapidly with the production ban of chlorofluorocarbons (CFC's). Thermoacoustic refrigerators can be constructed such that they use only inert gases, which are non-toxic and do not contribute to ozone depletion, nor to global warming. Exemplary prior art designs for thermoacoustic engines and refrigerators are shown in the following patents: U.S. Pat. Nos. 4,398,398; 4,489,553, 4,722,201, 5,303,555, 5,647,216, 5,953,921, 6,032,464, and 6,314,740.

For a complete appreciation of the present invention, an understanding of earlier heat engines is beneficial.

Commercial Failure of the Stirling Cycle

The idea of passing a gaseous working fluid back and forth through a porous medium of high heat capacity (a "regenerator") to improve the efficiency of a heat engine can be traced back to the invention in 1816, by Rev. Robert Stirling in England, of the thermodynamic cycle that bears his name. Although that invention was concerned with the production of useful mechanical work from heat, it was subsequently recognized that the Stirling cycle could be reversed to produce useful cooling, if mechanical energy was provided to the system.

The Stirling cycle has been attractive both as an engine and as a refrigerator for nearly two centuries because it could, in principle, achieve the maximum efficiency allowed within the constraints of the First and Second Laws of Thermodynamics. This limit of thermodynamically perfect performance is called the Carnot limit. Although an ideal Stirling engine or refrigerator could (in principle) exhibit Carnot performance, neither Stirling engines nor refrigerators ever achieved large-scale commercial success. A few engines based on the Stirling cycle have been used as the primary power source in submarines and many small refrigerators based on the Stirling cycle have been used to cool infrared detection electronics for military applications such as night vision goggles.

There are several reasons why this efficient approach to power production or refrigeration has not yet become commercially viable in most applications. The fundamental reason is that the improved efficiency (and more recently, the reduced environmental impact) of Stirling cycle devices was not an adequate incentive for its widespread adoption because the additional complexity and associated capital cost of the heat exchangers required by the Stirling cycle was not economically justified. In engine applications, the internal combustion engine was favored over the Stirling engine because it could exploit the high-temperature combustion of the fuel without requiring the solid parts of the engine to reach the same high temperature as the combustion products. After the energy was extracted from the combustion process, the excess heat carried by the combustion products could be exhausted directly to the atmosphere. No separate heat exchanger was required to exhaust waste heat from the engine, as required in closed cycle engines In refrigeration applications, the vapor-compression (Rankine) cycle has been the dominant means for mechanical production of refrigeration. Although the Rankine cycle is less efficient than an ideal Stirling cycle, the additional mechanical complexity of a Stirling refrigerator and the cost of the heat exchangers needed for Stirling cycle refrigeration was, again, not economically justified. In a vapor-compression refrigerator, the vaporized working fluid could be used to extract the heat directly from the refrigeration load without requiring a secondary heat exchanger and a secondary heat exchange fluid. Because the phase-change of the working fluid exploited by the Rankine cycle was accompanied by a large latent heat, it was possible to produce vapor-compression refrigerators for cooling loads as small as a few tens of watts or as large as air conditioners with a cooling capacity equivalent to the energy absorbed by the melting of 2,000,000 pounds of ice per day (about 3.5 megawatts of useful cooling power).

Recent Developments

During the $20^{th}$ century, many improvements to the Stirling cycle, for both refrigeration and for the conversion of heat to mechanical work, have been made. Thus far, none of these improvements have been sufficient to warrant the replacement of either the internal combustion engine or the vapor-compression refrigeration process by devices using a Stirling cycle. During the final quarter of the $20^{th}$ century, an awareness of the environmental impact of both the internal combustion engine and the chlorofluorocarbons (CFCs) and other man-made chemicals used in most vapor-compression refrigerators and air conditioners became widespread. The global effects of stratospheric ozone depletion caused by CFCs, and the anthropogenic contributions to global warming produced by "greenhouse gases", as well as other more localized effects such as "acid rain," have stimulated a careful re-examination of both engine and refrigeration technology.

Beginning in the early 1980's, "thermoacoustics" has been one path that has been pursued to provide a new paradigm for production of environmentally friendly and energy-efficient alternatives to internal combustion engines and vapor-compression refrigerators. The thermoacoustic paradigm attempts to use the pressure oscillations and gas motions associated with sound waves to execute engine and refrigeration cycles with a minimum of mechanical moving parts. This is a conceptual break from the $19^{th}$ century approach, in use to this day, that employs mechanical contrivances such as lubricated pistons moving in close-fitting cylinders, mechanically-actuated valves, flywheels, linkages, cams, etc., to impose the pressure changes and gas motions required to execute the cyclic processes that produce mechanical power or useful refrigeration. The first attempt to produce a practical "acoustical heat-pumping engine" (a thermoacoustic refrigerator) was patented by Wheatley, Swift, and Migliori in 1983 (see U.S. Pat. No. 4,398,398).

The Backhaus/Swift Engine

Since the invention of Wheatley, et al., there has been a continuous effort to produce thermoacoustic engines and refrigerators that would have the simplicity and robustness that came with the elimination of most mechanical parts, while achieving efficiencies that were comparable to or better than internal combustion engines and vapor-compression refrigerators. In 1999, Scott Backhaus and Greg Swift, both from Los Alamos National Laboratory in New Mexico, published the results of an experiment that used the thermoacoustic paradigm to produce a Stirling cycle engine that had a thermal efficiency of 30% [see "A thermoacoustic-Stirling heat engine," Nature 399, 335–338 (1999)]. Their experimental device combined an acoustic phasing network and acoustic resonator to produce a one-horsepower Stirling cycle engine that was as efficient as a gas-powered automotive internal combustion engine but required no moving parts.

A version of the Backhaus/Swift engine that is suitable for refrigeration applications is shown in FIG. 1, which is taken from U.S. Pat. No. 6,032,464 (originally FIG. 6) patented by Swift, Backhaus & Gardner. The engine 1 included a driver or sound source 2 (in this case an intrinsically irreversible thermoacoustic engine) attached to a pressure vessel 3. The engine includes a toroidal path defined by an inertance tube 4, a secondary chamber (compliance) 5, and a thermal buffer tube 6. A flexible diaphragm 7 is attached to one end of the thermal buffer tubes 6 to act as a mass flux suppressor. The acoustic power circulates clockwise through the toroidal path, as indicated by arrows A. Thermal components 8 are provided in the toroidal path, and include a regenerator 10, and a first heat exchanger 9, and second heat exchanger 11. The inertance tube 4 and compliance 5 form an acoustical phasing network to produce pressure oscillations and gas flows through the engine's regenerator that are in phase, as required by the Stirling cycle. Further aspects of the Backhaus/Swift engine will be appreciated by those of skill in the art upon a complete review of U.S. Pat. No. 6,032,464 and the above-referenced article by the inventors. Unlike the original designs for a "traveling wave heat engine" patented by Peter Ceperley [see "Traveling wave heat engine," U.S. Pat. No. 4,114,380 (Sep. 19, 1978); "Split mode traveling wave ring-resonator," U.S. Pat. No. 4,686,407 (Aug. 11, 1987); and "Resonant traveling wave heat engine," U.S. Pat. No. 4,355,517 (1982)], Swift, Backhaus & Gardner recognized that the ratio of the pressure to the volumetric velocity (the acoustic impedance) of the gas undergoing the Stirling cycle within the regenerator had to be much higher than the acoustic impedance that is characteristic of an acoustic traveling wave.

One drawback to the Swift, Backhaus & Gardner approach for either a thermoacoustic-Stirling engine or refrigerator is that their acoustic network creates a toroidal flow path that includes the regenerator and its associated heat exchangers. The toroidal flow path was also present in the designs of Ceperley. Such a flow path is shown in FIG. 1. The toroidal flow path allows steady circulation of the working fluid (Arrows A) driven by the flux of acoustic energy through the regenerator. That acoustically induced flow is known as Gedeon streaming and it can produce substantial reductions in the efficiency of the engine or refrigerator by convection of heat in the "wrong" direction.

For the Backhaus/Swift engine application, Swift, et al., invented a "jet pump" that used the asymmetry of inflow and outflow through a tapered orifice to produce a time-averaged backpressure to suppress the deleterious streaming flow. In the refrigeration application, they inserted a flexible diaphragm (7 in FIG. 1) to block the acoustically induced steady mass flow.

Acoustically induced streaming flow was deemed to be so detrimental for engine performance, the Los Alamos Thermoacoustics Group, headed by Dr. Swift, has recently abandoned the toroidal geometry for their next engine and has returned to a straight resonator. Their new design, which eliminates the toroidal flow path, is called "Cascade" and has been described in a recent publication [see S. Backhaus and G. Swift, "New varieties of thermoacoustic engines," Proc. $9^{th}$ Int. Congress on Sound and Vibration (July, 2002)].

In addition to the possibility of steady flow through the regenerator, another drawback to the thermoacoustic devices of Swift, et al. is the use of a column of gas to provide the inertance element (4 in FIG. 1), that forms a Helmholtz resonant "acoustic phasing network," in conjunction with the gas stiffness that functions as compliance element 5. The oscillatory gas flow through the inertance element generates three types of hydrodynamic dissipation, which reduces the overall efficiency of the heat pumping process. At any amplitude, there are viscous boundary layer losses on the inner surface of inertance tube 4. As the amplitude increases, the oscillatory boundary layer becomes unstable and the flow becomes turbulent, further increasing power dissipation, which can be calculated from the correlations presented in the well know Moody diagram.

At the high amplitudes required for commercially acceptable volumetric power density, there are also exit-entrance losses at both ends of inertance tube 4. In long piping systems, these exit-entrance losses are known as "minor losses" or "head losses." In thermoacoustic devices, such as that described by Swift, et al., above and by de Blok and Van Rijt below, these losses constitute a substantial fraction of the total input power. For the engine described by Backhaus and Swift, the thermoviscous losses in the inertance tube 4 is 4.9% of the total input power [see S. Backhaus and G. W. Swift, "A thermoacoustic-Stirling heat engine: Detailed study," J. Acoust. Soc. Am. 107(6), 3148–3166 (2000)]. The "minor losses" at the inertance tube exit and entrance constituted a loss of 10% of the total input power.

The de Blok/Van Rijt Engine.

At about the same time as the invention of the Backhaus/Swift engine, C. M. (Kees) de Blok and N. A. H. J. Van Rijt, in the Netherlands, patented another version of a traveling-wave phased, impedance enhanced thermoacoustic-Stirling engine. One embodiment of this engine/refrigerator is shown in FIG. 2, which originally appeared in U.S. Pat. No. 6,314,740 (also as FIG. 2). This design includes a piston which is joined to a rigid enclosure by a flexible bellows. An electromechanical actuator 16 is attached to the piston-bellows combination 17, which is joined to the rigid enclosure 15. The rigid enclosure 15 contains the thermoacoustic elements of this refrigeration system. An acoustic phase control bypass 18 is formed by an internal connection tube 19. A cold heat exchanger is shown at 20, with a cold transport fluid inlet 20*a* and outlet 20*b* provided for connection to a refrigeration load. A hot heat exchanger is shown at 21, with hot transport fluid inlet 21*a* and outlet 21*b* providing a means to exhaust the waste heat that is pumped by the regenerator 22. While appearing physically dissimilar to the Swift, Backhaus & Gardner refrigerator, the de Blok/Van Rijt approach also introduces an effectively toroidal flow path. The specification does not address the detrimental consequences that such a path entails, or the losses that are produced by the "gas-filled bypass element" 18 that functions as the inertance element in the acoustical phasing network.

The TRITON Project

During the same time Swift, et al., and de Blok and Van Rijt were developing the thermoacoustic-Stirling devices discussed above, the Applied Research Laboratory at The Pennsylvania State University was funded by the US Navy, through the Office of Naval Research, to produce a larger version of the Shipboard Electronic Thermoacoustic Chiller (SETAC). The SETAC device is shown in FIG. 3, which is taken from U.S. Pat. No. 5,647,216 (originally FIG. 1). As shown, this thermoacoustic device is a double-ended device with drivers located at each end. Thermal components are located adjacent each driver, with the thermal components, including a stack, and a pair of heat exchangers at each end. The SETAC device was tested on board the USS Deyo (DD-989), a Spruance-class destroyer in the Atlantic Fleet, in April 1995. It demonstrated a maximum cooling capacity of 419 watts. The TRITON Project was an attempt to increase the cooling capacity of a SETAC-like device to 10 kilowatts; a cooling capacity equivalent to the latent heat absorbed by the melting of 3 tons (hence, TRI TON) of ice per day. (One ton of cooling is defined as 36,000 Btu/hr=3,517 watts.)

As part of the TRITON Project, flexure seals that employed metal bellows were developed that could function without fatigue failure at acoustic frequencies. These bellows were combined with mechanical springs and moving-magnet linear motors to produce electrodynamic loudspeakers that had power-handling capacities as large as 5 kW and electroacoustic conversion efficiencies that were nearly 90% (see U.S. Pat. No. 6,307,287). The measured efficiencies of these moving-magnet "loudspeakers" were found to be in excellent agreement with theoretical performance predictions of Wakeland [see R. S. Wakeland, "Use of electrodynamic drivers in thermoacoustic refrigerators," J. Acoust. Soc. Am. 107(2), 827–832 (2000)], using measurements of the moving-magnet linear motor parameters that characterize the electromagnetic force factor and the electrical and mechanical dissipation.

The TRITON device also employed a double-Helmholtz resonator geometry that was similar to that used in SETAC. During testing of TRITON, the dissipation of acoustic power associated with the high-velocity oscillatory gas motion, particularly though the neck of the Helmholtz resonator and through the transitions between the neck and the two "bulbs," led to unacceptably large nonlinear hydrodynamic losses. These hydrodynamic losses produced a substantial reduction in the overall performance of that refrigeration unit.

The Bellows Bounce Thermoacoustic Device

Two important lessons were learned from the TRITON Program, both in (i) the development of bellows to provide a low-loss, reliable, dynamic pressure flexure seal, and in (ii) the appreciation of the non-linear hydrodynamic losses associated with oscillatory gas flows at high Reynolds number and at transitions between parts of the resonator with different cross-sectional areas that is known as "minor loss" or "head loss." It was recognized by the inventors that the resonator losses could be entirely eliminated and the size of a thermoacoustic chiller, for a given cooling capacity, could be substantial reduced, if the thermoacoustic core (regenerator and heat exchangers) and phasing network (inertance and compliance) were contained entirely within the bellows. Furthermore, it was recognized by the inventors that the resonant enhancement of the pressure oscillations created by the double-Helmholtz resonator could be duplicated, without the non-linear hydrodynamic losses inherent in the high-velocity gas motion through the neck, by using the elastic stiffness of the gas contained with the bellows and the moving mass of the linear motor and its attached piston, to create a mechanical resonator rather than a purely acoustic resonator used in TRITON, as well as all of the earlier thermoacoustic refrigerators. This novel resonator was named a "Bellows Bounce" compressor by its inventors, and is the subject of U.S. provisional patent application Ser. No. 60/372,008, filed Apr. 10, 2002, and a co-pending U.S. patent application entitled "Compliant Enclosure for Thermoacoustic Devices," Ser. No. 10/409,855, filed Apr. 9, 2003, the entire contents of both of which are incorporated herein by reference.

An alternative to conventional bellows was also developed, and is the subject of U.S. provisional patent application Ser. No. 60/371,967, filed Apr. 10, 2002, and a co-pending U.S. patent application entitled "Cylindrical Spring with Integral Dynamic Gas Seal," Ser. No. 10/409,760 filed Apr. 9, 2003, the entire contents of both of which are incorporated herein by reference. The cylindrical spring with integral dynamic gas seal provides an alternative to a more typical bellows that may enable greater design flexibility, lower production cost, and a significantly smaller surface area compared to a conventional bellows of equal volume with similar height and diameter.

SUMMARY OF THE INVENTION

The present invention provides various embodiments of thermoacoustic devices utilizing a main volume and a secondary multiplier volume, each in communication with the thermal components. These thermal components include a regenerator, and first and second heat exchangers. The secondary multiplier volume acts as a vibromechanical multiplier to provide an acoustic phasing network which also acts to suppress Gedeon streaming without requiring the interposition of the flexible diaphragm (7 in FIG. 1) of Swift, Backhaus & Gardner, nor introduction of the "jet pump" used in the Backhaus/Swift engine.

In one embodiment of the present invention, the thermoacoustic device includes a housing with a thermal core supported in the housing and having a first and a second surface. The thermal core includes a first heat exchanger defining the first surface of the thermal core and a second heat exchanger defining the second surface of the thermal core. Between these two heat exchangers is a regenerator or other porous thermal storage medium. A main chamber is in fluid communication with the first surface of the thermal core and a secondary multiplier chamber is in fluid communication with the second surface of the thermal core. A working volume of a gaseous working fluid fills the main chamber, the multiplier chamber, and the thermal core at a pressure. An equilibrium pressure is defined as the pressure of the working volume of gaseous working fluids when the thermoacoustic device is in a non-operating mode. The main chamber includes a first oscillating member that is operable when the thermoacoustic device is in an operating mode to oscillate such that the pressure in the main chamber is sinusoidally oscillated between a peak pressure greater than the equilibrium pressure and a minimum pressure less than the equilibrium pressure. A main pressure amplitude is defined as one-half of the difference between the peak pressure and the minimum pressure in the main chamber. The secondary multiplier chamber includes a second oscillating member that is operable when the thermoacoustic device is in the operating mode to oscillate such that the pressure in the multiplier chamber is sinusoidally oscillated between a peak pressure greater than the equilibrium pressure and a minimum pressure less than the equilibrium pressure. A multiplier pressure amplitude is defined as one-half of the difference between the peak pressure and the minimum pressure in the multiplier chamber. The first and second oscillating members oscillate at substantially the same frequency and such that the pressure oscillations in the main chamber and the multiplier chamber are substantially in phase with each other. The multiplier pressure amplitude is greater than the main pressure amplitude.

In another embodiment, a thermoacoustic device includes a housing with a first end and a second end. A cold head heat exchanger defines the first end of the housing. The cold head heat exchanger has an exterior heat exchange surface in thermal communication with an interior heat exchange surface. A multiplier chamber is disposed in the housing and has a multiplier volume defined therein. The multiplier volume includes a multiplier oscillating member which is movable such that the multiplier volume is increased and decreased. A main chamber is disposed in the housing and has a main volume defined therein. The main chamber includes a main oscillating member which is movable such that the main volume is increased and decreased. A support is disposed in the housing adjacent the interior heat exchange surface of the cold head heat exchanger. The support defines a first passage between the multiplier volume and the interior heat exchange surface of the cold head heat exchanger and a second passage between the main volume and the interior heat exchange surface of the cold head heat exchanger. Therefore, the main volume and the multiplier volume are in fluid communication through the first and second passages. A thermal storage element is disposed in one of the passages. The thermal storage element has a first surface and a second surface, with the first surface being adjacent the interior heat exchange surface of the cold head heat exchanger. A hot heat exchanger is disposed adjacent the second surface of the thermal storage element. In some versions, the multiplier chamber is disposed inside the main chamber.

DETAILED DESCRIPTION OF THE INVENTION

The present invention provides a thermoacoustic device with a thermal core including a regenerator or other thermal storage medium sandwiched between first and second heat exchangers. A main volume is preferably defined by a compliant enclosure and is in fluid communication with one of the heat exchangers. A piston forms part of the compliant enclosure and oscillates so as to change the volume in the enclosure. A second multiplier chamber is in fluid communication with the other heat exchanger and also has an oscillatory member for oscillating the volume in the multiplier chamber. The piston and the oscillating member move approximately in phase with one another such that the pressure introduced to the chambers rises at approximately the same time and approximately in phase with one another. Using a thermoacoustic Stirling effect, the oscillating pressure waves pump heat from one of the heat exchangers to the other. Alternatively, heat may be provided to one of the heat exchangers and power extracted by attaching the piston to an alternator or some other means to produce electricity or by attaching the piston to some other device thereby providing energy in the form of reciprocating mechanical motion.

First Preferred Embodiment—Overview

Figure 4:
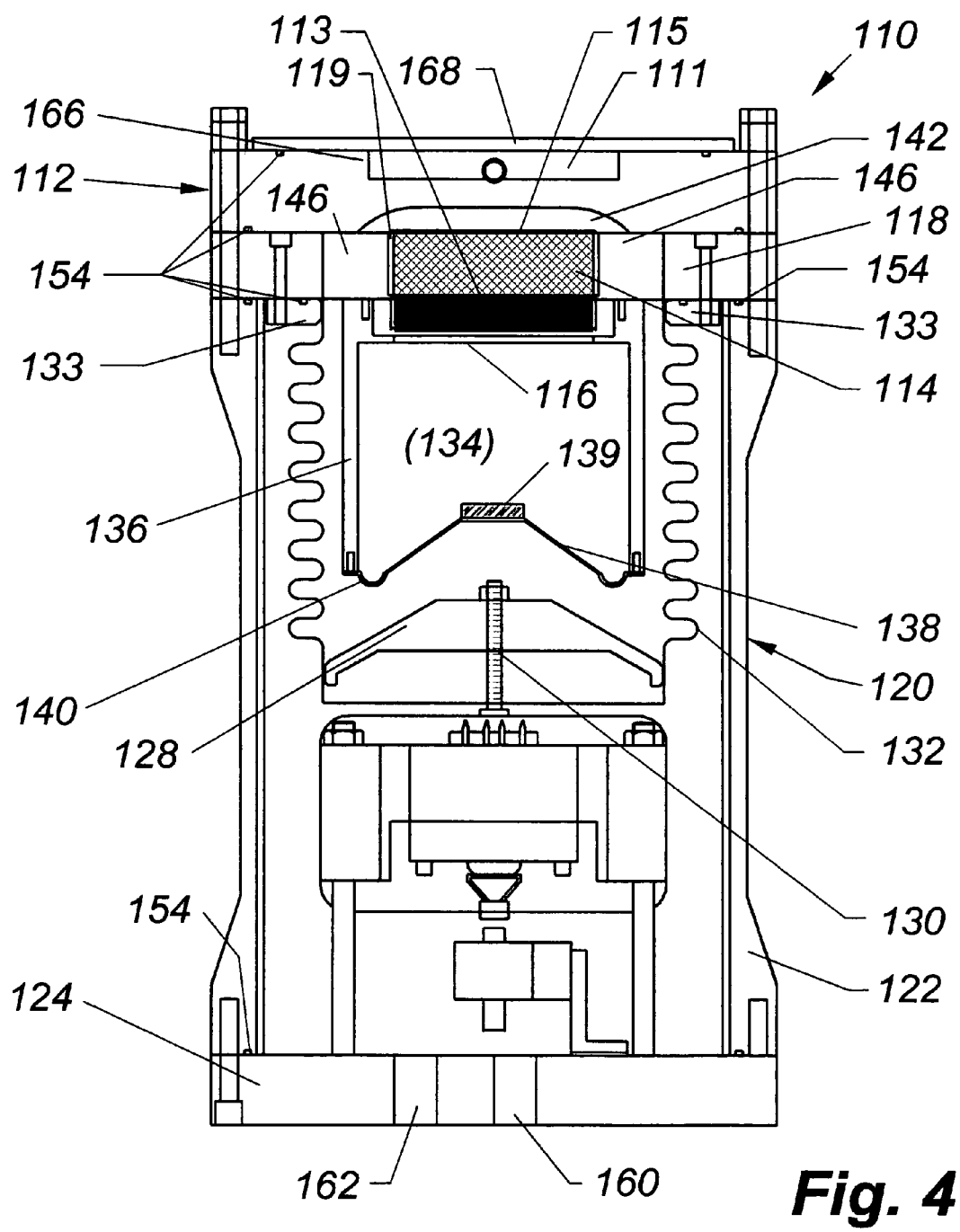
FIG. 4 is a cross-sectional view of a first preferred embodiment of a thermoacoustic device according to the present invention.
Figure 5:
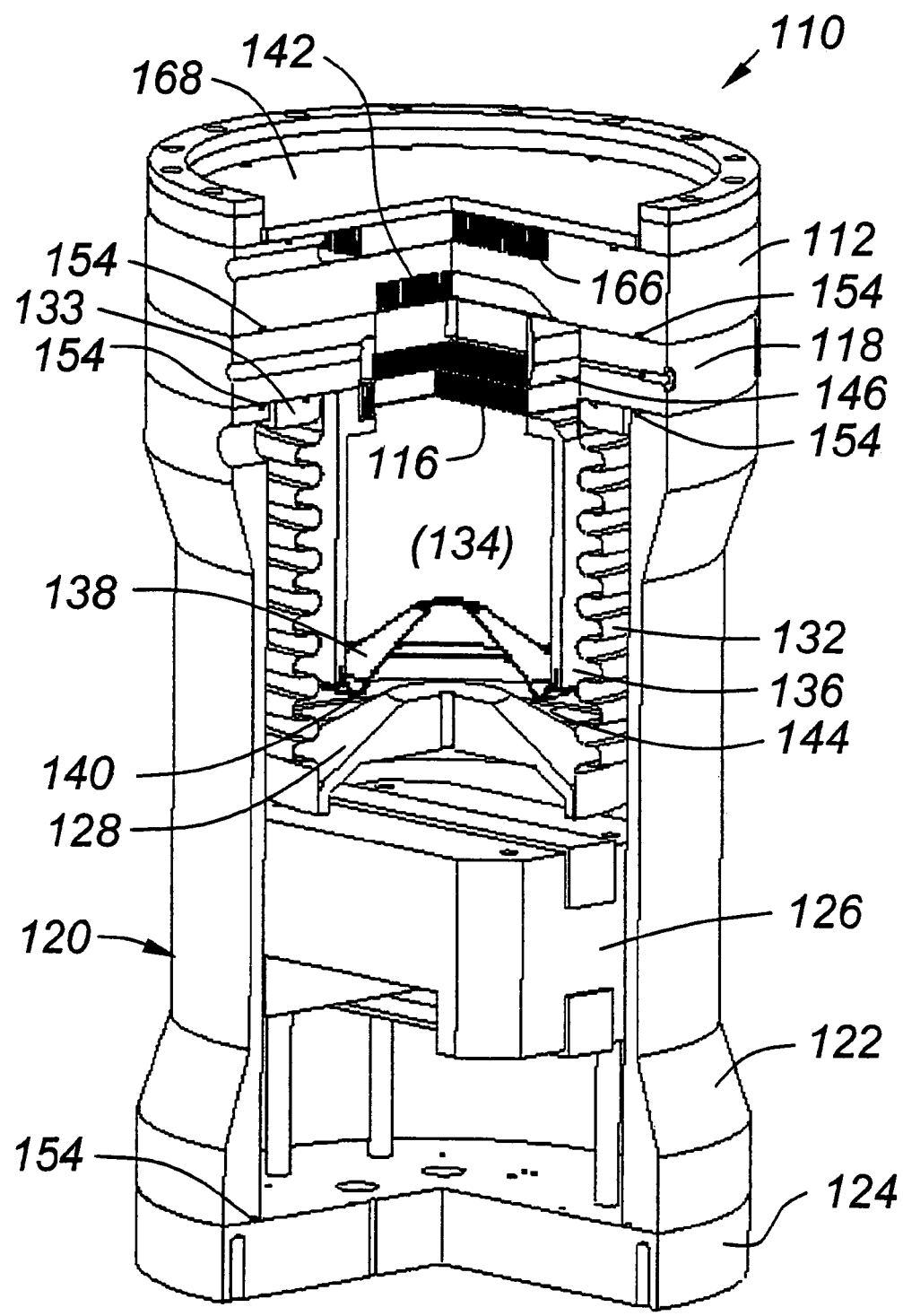
FIG. 5 is a sectioned perspective view of the thermoacoustic device of FIG. 4.

FIG. 4 shows a cross-sectional side view of one preferred embodiment of a thermoacoustic device 110 according to the present invention. FIG. 5 shows the same thermoacoustic device 110 with portions cut away, and some components left out of the view for simplicity. This device 110 is designed to produce a refrigeration effect by absorbing heat through a unitized cold head heat exchanger 112 and delivering that heat at a lower temperature to a regenerator 114, contained in a thermally-insulated and thermally insulating support or platform 118. The energy in sound waves is used to pump that heat up to a higher temperature at the hot end of the regenerator 114. This heat, plus any acoustic energy deposited by the thermoacoustic heat pumping process, is deposited on the hot heat exchanger 116. The heat deposited on the hot heat exchanger 116 is exhausted from the system by hot heat exchange transport fluid that passes through the heat exchanger 116.

The components of the thermoacoustic device 110 are preferably housed in a pressure vessel 120. The pressure vessel 120 is formed by a generally cylindrical wall or shell 122 that is closed on its "lower" end by a base plate 124. It should be noted that descriptors such as "upper" and "lower" are used merely for ease of description of the figures, but are not limiting on the configuration or positioning of embodiments of the present invention. In fact, the embodiment of FIGS. 4 and 5 is preferably operated in an inverted position as compared to the illustrated position. It can also be oriented in other positions. The position descriptors used herein refer to the illustrated orientations. The upper end of the wall or shell 122 is closed off by the combination of the platform or support 118 and the cold head heat exchanger 112, as will become more clear with respect to the further description of the cold head heat exchanger 112 hereinbelow.

A linear motor 126 is attached to the bottom plate 124 and the moving portion of the linear motor 126 is connected to the main piston or power piston 128 by a connecting member 130 (not shown in FIG. 5). A bellows 132 extends between the power piston 128 and the support 118. This defines part of a compliant enclosure, in accordance with the disclosure in U.S. provisional patent application Ser. No. 60/372,008, and a co-pending patent application entitled "Compliant Enclosure for Thermoacoustic Devices," filed Apr. 9, 2003, the entire contents of both of which are incorporated herein by reference. Additional discussion and benefits of this compliant enclosure are provided in these applications. As the power piston 128 moves upwardly, the working fluid in the compliant enclosure is compressed, and as the power piston 128 moves downwardly, the working fluid in the compliant enclosure is decompressed.

In accordance with the present invention, a multiplier volume 134 is defined inside the compliant enclosure. This multiplier volume 134 is defined by a multiplier cylinder 136 which has an upper end attached to the support 118 and a lower end closed off by a multiplier cone or piston 138. A flexible seal 140 interconnects the cone or piston 138 with the cylinder 136. As the multiplier cone 138 moves upwardly and downwardly, the volume of the multiplier volume, and the pressure of the gas contained therein, is increased and decreased.

Figure 6:
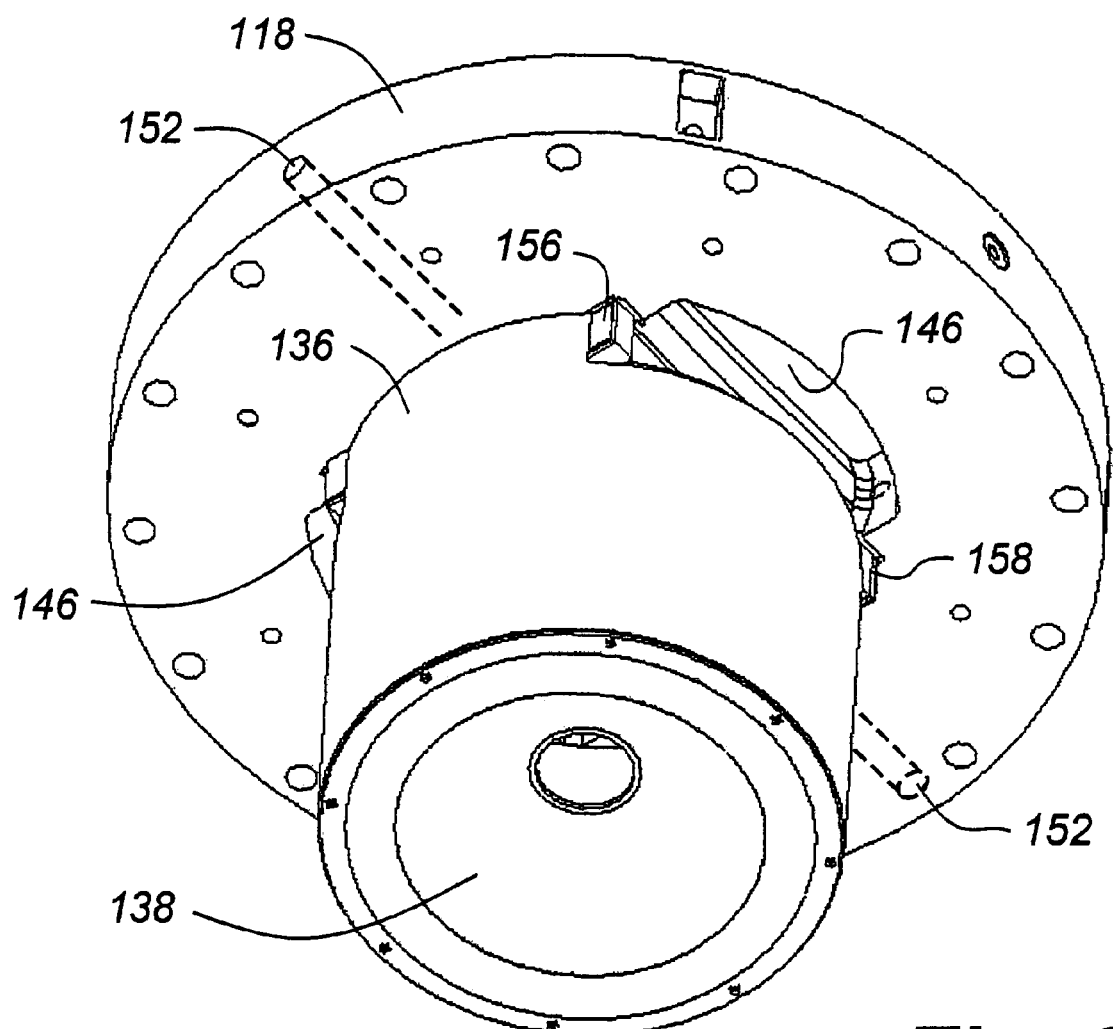
FIG. 6 is a perspective view of certain portions of the thermoacoustic device of FIGS. 4 and 5.
Figure 7:
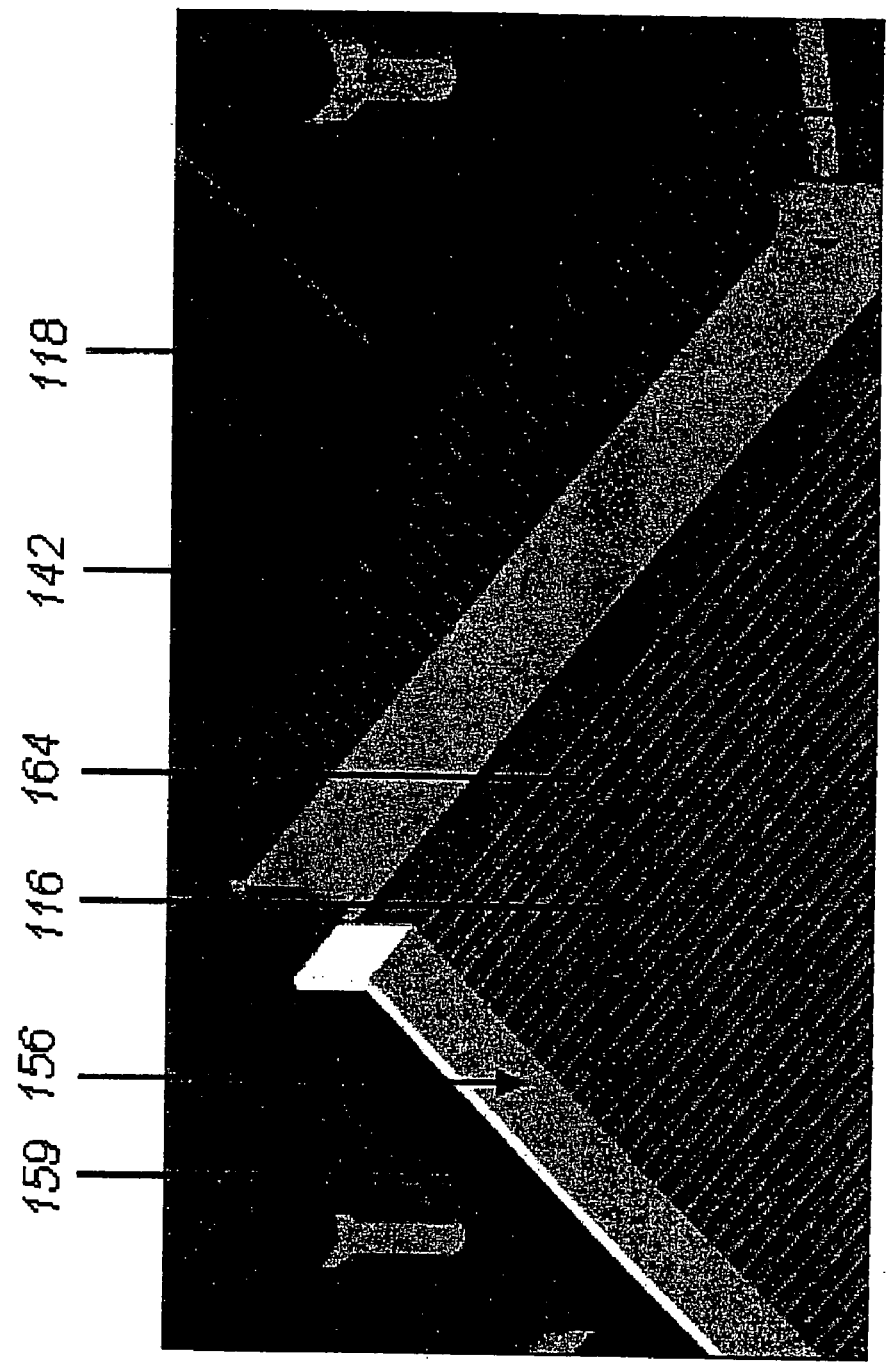
FIG. 7 is a detailed view of some of the thermal components of the thermoacoustics device of FIGS. 4–6.

FIG. 6 is a view of the support 118 with the multiplier cylinder 136 attached. FIG. 7 is a detailed view of just a portion of the hot heat exchanger 116, the platform 118, and the fins 142 on the lower side of the cold head heat exchanger 112.

The volume of working fluid inside the compliant enclosure and outside the multiplier volume 134 may be referred to as the main volume 144. The main volume 144 and the multiplier volume 134 are in fluid communication through the thermal components. That is, a fluid path is defined from the multiplier volume 134, through the hot heat exchanger 116, through the regenerator 114, through the fins 142 of the cold heat exchanger 112, and through windows 146 in the support 118. Therefore, gas can flow from the main volume 144 through the windows 146, make a U-turn through the fins 142, and enter the regenerator 114. In operation, the multiplier piston 138 and power piston 128 move generally in phase or close to being in phase with one another. Therefore, flow of gas between the multiplier volume 134 and main volume 144 is limited, since a pressure wave converges and diverges from both "sides" of the regenerator 114.

A more detailed description of the various components of the thermoacoustic device 110 will now be provided.

Thermal Core

The thermoacoustic heat pumping process takes place within the thermal components or thermal core, comprised of the regenerator 116, supported by the thermally insulating platform 118, the unitized cold head heat exchanger 112, and the hot heat exchanger 116. The regenerator 116 may be said to have a hot or lower face 113 and a cold or upper face 115. The unitized cold head heat exchanger 112 has an inner heat exchange surface, which is defined by the fins 142 in this embodiment, and an exterior heat exchange surface 111. These heat exchange surfaces are in thermal contact with one another so as to transfer heat from the exterior heat exchange surface 111 to the interior heat exchange surface, defined by fins 142. As shown, the hot heat exchanger 116 is adjacent the hot face 113 of the regenerator 114, while the cold head heat exchanger 112 is adjacent the cold face 115 of the regenerator 114. In this embodiment, the hot heat exchanger 116 is affixed to the thermally insulating platform 118, through which a hot heat exchange transport fluid enters the hot heat exchanger 116 from an inlet tube 150 and exits from an outlet tube 152 (FIG. 6). The unitized cold head heat exchanger 112 is in direct physical contact with both the cold face of the regenerator 114 and the upper surface of the thermally insulating platform 118. An o-ring is placed in an o-ring groove 154 between the unitized cold head heat exchanger 112 and the thermally insulating platform 118 to produce a gas-tight seal. The material used to make the thermally insulating platform 118 is preferably strong enough to act as part of the pressure vessel, if required, and has a sufficiently low thermal conductivity to produce a path of high thermal resistance between the unitized cold head heat exchanger 112, which is at a low temperature, and the cylindrical pressure vessel wall 122, which is typically at a higher temperature.

The thermal core, including the regenerator 114 and the heat exchangers 112 and 116 may be said to have a first and second surface, or alternatively, a cold and a hot surface. In the illustrated embodiment, the hot heat exchanger 116 forms the hot surface of the thermal core, while the fins 142 of the cold head heat exchanger 112 form the cold surface. The multiplier volume 134 may be said to be in fluid communication with the hot surface of the thermal core since it is in fluid communication with, and partially contains, the hot heat exchanger 116. The main volume 144 may be said to be in fluid communication with the cold surface of the thermal core, since it is in fluid communication with the interior heat exchange surface, defined by fins 142, of the cold head 112. As shown, the support 118 defines a passage 119 with the regenerator 114 disposed therein. This first passage 119 provides fluid communication between the multiplier volume 134 and the cold surface 142 of the cold head 112. The windows 146 and the support 118 provide a second passage, and provide fluid communication between the main volume 144 and the cold surface 142 of the cold head 112. Therefore, the main volume 144 and multiplier volume 134 are in fluid communication through the first and second passages 119 and 146. The configuration of the passages causes the working fluid to pass through the thermal core. As will be clear to those of skill in the art, the passages 119 and 146 may be configured in other ways than illustrated. Also, the thermal core may be configured differently than illustrated, and may be located differently, such as by placing the regenerator and hot heat exchanger in a different position or in the second passage. The surfaces of the thermal core do not necessarily need to be parallel to one another, or planar. Additionally, the individual components of the thermal core may be configured differently than illustrated. It may be desirable to place screens or other flow straightening mechanisms at the exit of the cold head, where gas enters the window, to produce flow with a substantially uniform velocity flow profile across the window. Such a uniform flow permits acoustic power to flow without producing substantial turbulent mixing of the cold gas which enters and exits the cold head, with gas which can communicate thermally with parts other than the cold head and the window, which may be at warmer temperatures. If a substantial amount of such mixing occurs, it reduces the cooling capacity of the refrigerator, by delivering unwanted heat to the cold head.

The choice of the hot heat exchange transport fluid depends upon the materials used in the construction of hot heat exchanger 116 and its inlet manifold 156 and outlet manifold 158. A typical hot heat exchanger transport fluid may be water if the hot heat exchanger is constructed from copper or brass. It may be a mixture of glycol and water, which may also contain corrosion inhibitors, if the hot heat exchanger is constructed from aluminum. The choice of hot heat exchange fluid would be obvious to one skilled in the art of conventional compact heat exchanger design.

Working Fluid

The entire refrigeration apparatus is preferably contained within a pressure vessel 120, which contains any gaseous working fluid with a polytropic exponent γ greater than one, at any pressure, if properly designed. The gas so contained functions as the working fluid for the thermoacoustic-Stirling cycle [see G. W. Swift, *Thermoacoustics: a unifying perspective for some engines and refrigerators*, (Acoustical Society of America, 2002); ISBN 0-7354-0065-2] to produce the desired refrigeration effect. One preferred gaseous working fluid is helium gas at pressures in the range from atmospheric pressure ($\cong$100 kPa) to thirty times atmospheric pressure ($\cong$3.0 MPa). Helium is a particularly good choice of working fluid because it is chemically inert; hence, non-flammable, non-explosive, and environmentally benign. Helium gas also has a very high thermal conductivity, a thermophysical property that makes it easier to design high-efficiency, compact heat exchangers.

The gas-tight pressure vessel 120 is comprised of the base plate 124, the unitized cold head heat exchanger 112, and the cylindrical pressure vessel wall 122. The thermally insulating platform 112 may be disposed between the unitized cold heat exchanger 112 and the cylindrical pressure vessel wall 122, to act as a portion of the pressure vessel that can accommodate gas-tight electrical feed-throughs or fluidic feed-throughs such as hot heat exchange transport fluid inlet tube 150 and outlet tube 152. The base plate 124 might also contain gas-tight feed-throughs 160 to accommodate electrical connections between the linear motor 126 within the pressure vessel and the source of its sinusoidal current located outside the pressure vessel. The feed-throughs 160 may also accommodate electrical connections between a position sensor 162 within the pressure vessel and the sensor's signal conditioning electronics outside the pressure vessel. Demountable interfaces between the components of the pressure vessel can be sealed by rubber o-rings that are placed in o-ring grooves 154 in the unitized cold head heat exchanger 112, the thermally insulating platform 118, the base plate 124, and the cylindrical pressure vessel wall 122.

As shown, the pressure vessel 120 also serves as a housing for the various components of the device 110. Alternatively, a housing may be provided that does not act as a pressure vessel.

Linear Motor

Mechanical work is required to pump heat from the unitized cold head heat exchanger 112, through the regenerator 114, and out through the hot heat exchanger 116. That mechanical work is provided by the linear motor 126 that converts an alternating (sinusoidal) current of the proper frequency and amplitude to an alternating (sinusoidal) force. Many different linear motor mechanisms are commercially available and the choice of motor type, based on its parameters, has been discussed by Wakeland [see R. S. Wakeland, "Use of electrodynamic drivers in thermoacoustic refrigerators," J. Acoust. Soc. Am. 107(2), 827–832 (2000)] and described in an earlier patent [see U.S. Pat. No. 6,307,287]. For this embodiment, a moving-magnet, electrodynamic linear motor such as that described by Yarr and Corey [see U.S. Pat. No. 5,389,844], or by Froeschle and Carreras [see U.S. Pat. No. 5,216,723], is assumed, although other linear motors using other mechanisms (such as piezoelectric effect) are possible. For purposes of the present invention, "motor" means any mechanical device operable to oscillate the power piston of a thermoacoustic device.

As discussed previously, for electrically driven applications, a linear motor is the preferred choice to oscillate the piston in the various embodiments of the present invention. Several reasons encourage this choice.

First, as shown earlier, and in documents referenced herein, the operating frequency of the bellows has an important impact on the operating stresses, and thus on the extent of the piston motion which can be permitted for continuous operation, and the latter directly impacts the accessible pressure ratio. To optimize a bellows to obtain the highest possible axial displacement for a given volume, operation at a fixed operating frequency is required. While conversion of rotary motion into reciprocating motion is routinely performed with a cam or other mechanical devices, in general a rotary motor cannot instantaneously achieve a particular angular rotation rate, so that the bellows may be subjected to a range of frequencies in reaching the final operating point, which are all potentially sub-optimal for the bellows.

A second feature, which favors linear motors is that proportional control of a thermoacoustic device of the sort contemplated in the exemplary embodiments can be achieved by varying the amplitude of the piston (without variation of the frequency). An ordinary cam or eccentric drive would not permit variation of the piston amplitude. Again, it is possible to produce a mechanical mechanism which can both convert rotary motion to reciprocating motion, and provide a means to vary the amplitude at fixed rotation rate, but such a mechanism is clearly more complex.

Figure 2:
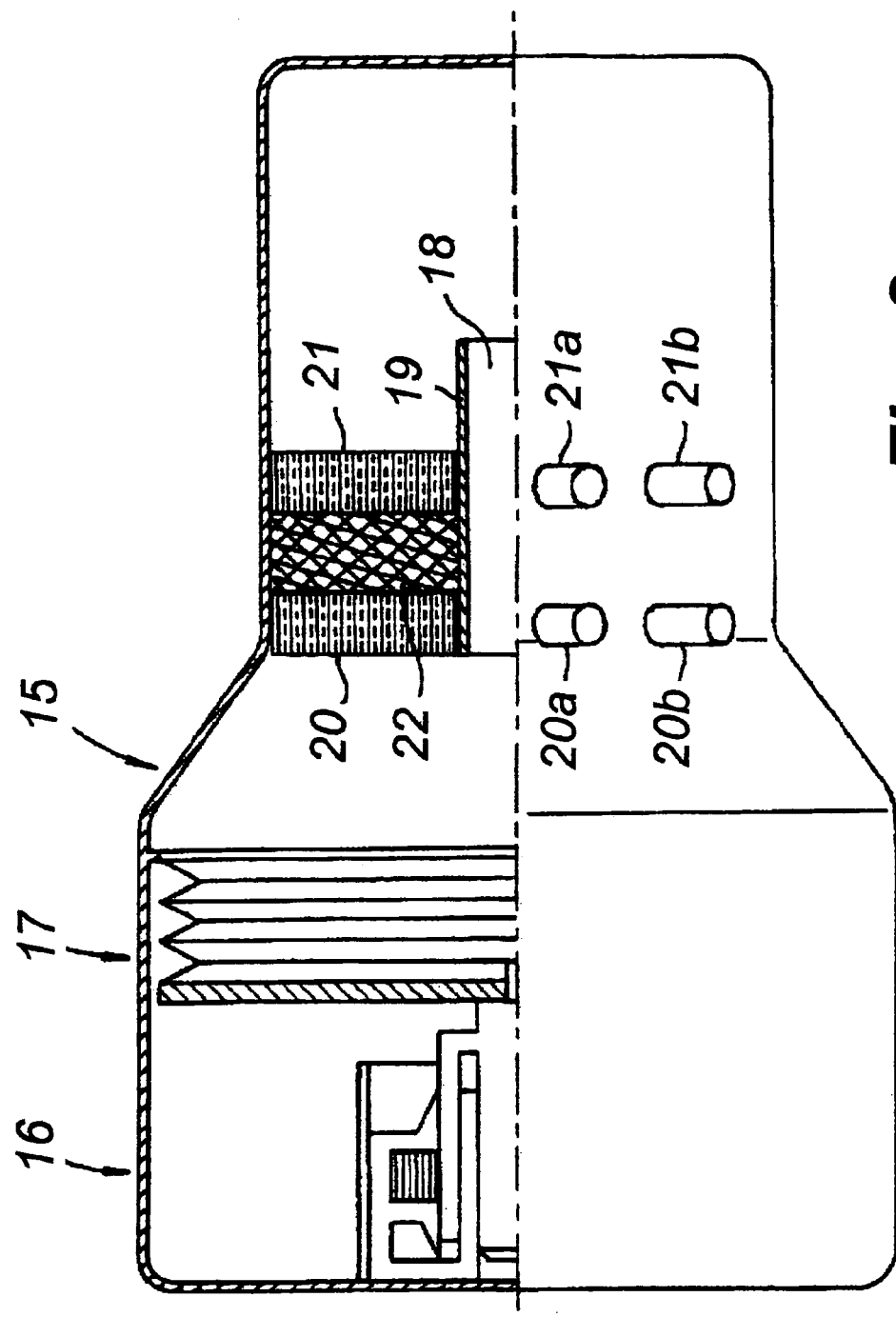
FIG. 2 is a cross-sectional view of another prior art thermoacoustic device.
Figure 3:
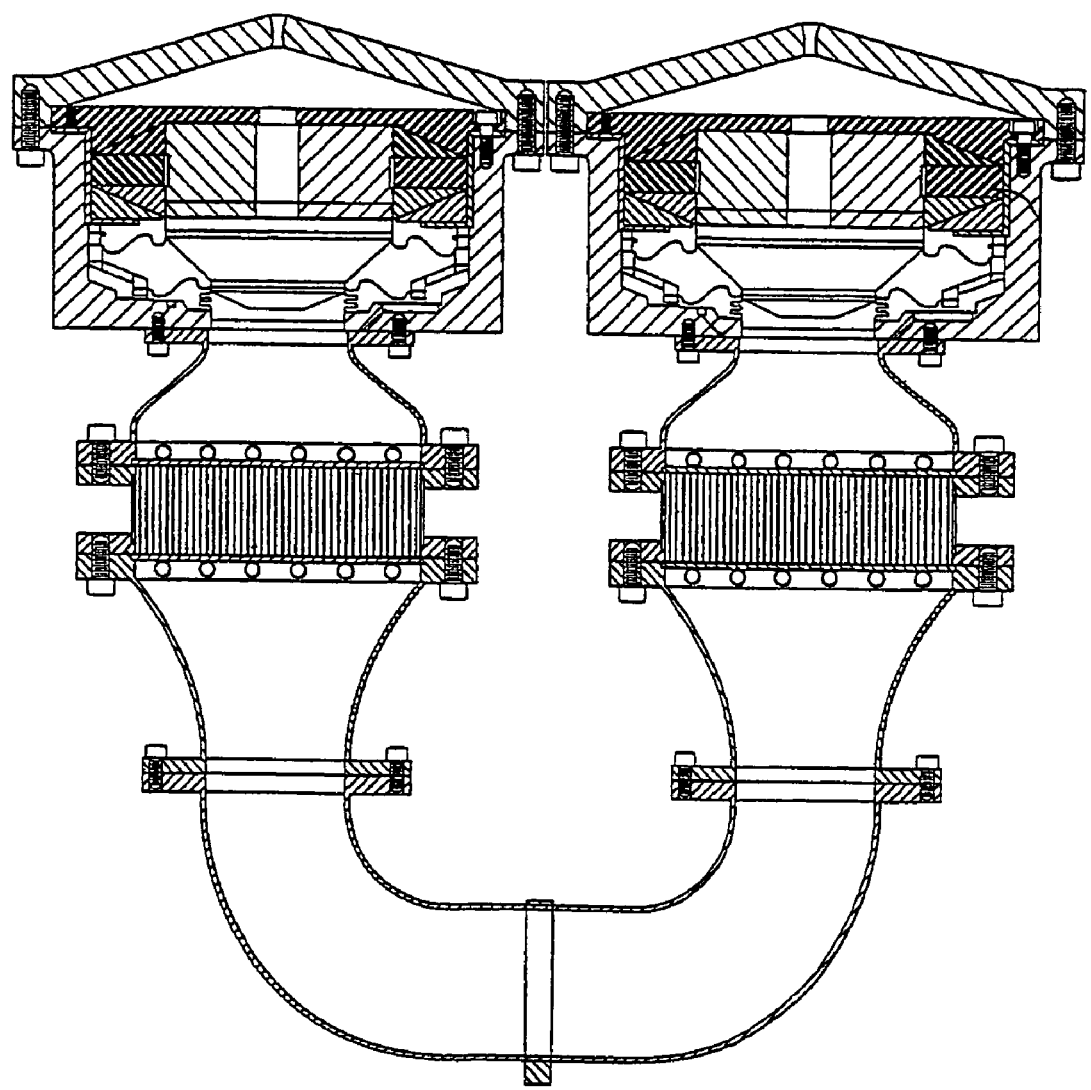
FIG. 3 is a cross-sectional view of yet another prior art thermoacoustic device.

Further, it is widely recognized that the efficiency, excursion, and power density of electrodynamic linear motors is significantly greater at higher powers ($\geqq$100 W) if the magnet oscillates and the coil is stationary [see R. S. Wakeland, *J. Acoust. Soc. Am.* 107(2), 827–832 (2000), Table I.] Because the mass of the moving magnet structure can be greater than the mass of moving coils (voice coils) used in conventional electrodynamic loudspeakers, it may be necessary to provide substantial stiffness to resonate the larger magnet moving mass at frequencies of interest in thermoacoustic devices. The large gas stiffness provided by the gaseous working fluid contained within the compliant cavity (and also outside the bellows if a pressure containment vessel is employed as shown in the First Exemplary Embodiment of FIG. 2) provides all, or at least a substantial part, of the stiffness required to resonate the mass of the moving magnet structure, as well as the moving mass of the other parts of the electroacoustic transduction system (e.g., piston, connection tube, etc).

Compatibility with moving-magnet linear motors is also considered to be advantageous, since it has been shown [see R. W. M. Smith, *High Efficiency Two Kilowatt Acoustic Source for a Thermoacoustic Refrigerator*, Penn State Applied Research Laboratory Technical Report No. TR 01-001 (November 2000)] that the electro-mechanical conversion efficiency of moving-magnet linear motors increases as the power demand from the motor decreases. This increase in efficiency is opposite of that observed for conventional rotary motors [see E. A. Avallone and T. Baumeister III, *Mark's Standard Handbook for Mechanical Engineers*, $10^{th}$ ed. ($M^c$Graw-Hill, 1996), Table 15.1.13]. The increase in efficiency of moving-magnet linear motors is particularly attractive if a proportional control scheme is used to control the temperature of the refrigerated space by continuously varying the power demanded from the motor. Therefore, it is preferred that a linear motor is used with the present invention. However, other devices, such as rotary motors, may be used.

Instead of rigid connection of motor 126 to base plate 124, a resilient motor mount could be substituted to produce a two-degree-of-freedom. Motor 126 can thus move with a phase that is opposite to motor moving part. Such an arrangement could reduce transmission of vibration to other parts of the structure containing the thermoacoustic engine or refrigerator.

Piston

The power piston 128 and multiplier cone or piston 138 may both be referred to generally as pistons or oscillating members. The term "oscillating member" may also refer to different configurations such as a moving membrane, a member with a clearance seal rather than a flexure seal, or other designs. The pistons in any of the embodiments may also be shaped differently than illustrated. The generally truncated cone-shape is generally preferred since it provides stiffness and helps to exclude some of the volume in the main volume 144 and multiplier volume 134. However, other shapes, such as cross-sections of isosceles trapezoids or hemi-ellipses could be used, and would maintain rigidity and low mass while excluding some of the volume adjacent the pistons. As yet another alternative, the pistons may be flat. While in the illustrated embodiments, they have a generally circular shape, they may instead be other shapes, especially where the multiplier chamber or main chamber walls are not generally cylindrical.

Compressor Volume Compliant Enclosure

The force produced by the linear motor 126 is communicated to the power piston 128 by the rigid connecting member 130. The power piston 128 is rigidly affixed to the moving end of the bellows 132, forming a gas-tight seal between the power piston 128 and the moving end of the bellows 132. The fixed end of the bellows 132 is sealed in a gas-tight fashion to the thermally insulating platform 118. In this embodiment, the bellows 132 is joined to a bellows flange 133 with an adhesive to produce a gas-tight seal. The bellows flange 133 is sealed using an o-ring contained within an o-ring groove 154 to insure a gas-tight seal to the thermally insulating platform 118.

The embodiment of the present invention shown in FIG. 4 utilizes a "compliant enclosure," as discussed more fully in U.S. provisional patent application Ser. No. 60/372,008, and the co-pending patent application entitled "Compliant Enclosure for Thermoacoustic Devices," Ser. No. 10/409, 855filed Apr. 9, 2003. The compliant enclosure is defined primarily by the bellows 132, which provide the sidewalls of the enclosure. The cold head heat exchanger 112 and support or platform 118 cooperate to define the upper end of the compliant enclosure, while the piston 128 closes off the lower end of the compliant enclosure.

The bellows 132 may be more generically defined as a "flexure seal," that has a pair of ends and a flexure body extending therebetween. One end is sealingly closed by the piston 128 while the other end is closed by the combination of the support 118 and cold head 112, which acts as a rigid portion of the compliant enclosure. A flexure volume may be defined as the volume contained within the flexure seal. It is equal to the product of the average cross-sectional area of the flexure seal or bellows 132 and the end-to-end length of the flexure seal or bellows 132. As shown, some of the flexure volume is displaced by components disposed in or extending into the flexure volume. For example, the piston 128 is shaped as a truncated cone and extends partially up into the flexure volume. Likewise, the multiplier cylinder 136 and multiplier cone 138 extend downwardly into the flexure volume. The hot heat exchanger 116, and/or other thermal core components, may also extend downwardly into the flexure volume.

A working volume for the device 110 may be defined as the volume of a working gaseous fluid contained in the compliant enclosure. In the illustrated embodiment, the working volume is preferably smaller than the bellows volume, since much of the bellows or flexure volume is displaced by other items. The working volume may be defined as the bellows or flexure volume minus any volume displaced by components that extend into the bellows or flexure volume, plus any additional volume outside of the bellows. For example, additional volume is provided inside the regenerator 114, the fins 142, and the passages 146. It should be noted that the multiplier volume 134 is not considered displaced from the volume, since it also contains a portion of the working volume of the device 110. Alternatively, the working volume is also equal to the main volume 144, plus the multiplier volume 134, plus any additional volume contained in the passages 146, fins 142, and regenerator 114. As the hot heat exchanger 116 extends partially into the multiplier volume 134, the volume contained therein may be considered to be part of the multiplier volume. Alternatively, it may be considered part of the additional volume.

In accordance with the discussion in the incorporated disclosures, the compliant enclosure design allows for significantly larger volume changes, and therefore significantly higher pressure fluctuations in the main volume 144 and multiplier volume 134. Preferably, the working volume is less than or equal to the bellows volume, though in some embodiments, the working volume may be greater than the bellows volume. For example, the working volume may be less than or equal to 1.0 or 5.0 times the bellows volume. In other embodiments, the working volume is equal to or less than 0.9 times the bellows volume, or 0.85 times the bellows volume. In accordance with incorporated disclosures, it is preferred that the pressure amplitude (defined as half the difference between the peak pressure and minimum pressure) is at least five percent of the equilibrium pressure. The equilibrium pressure is defined as the pressure within the device when it is in its non-operating mode. As discussed hereinbelow, known flexure seals are generally limited to a displacement of no more than ten percent of their length for an application such as in the present invention. With a gas with a polytropic coefficient of 5/3, this allows a pressure amplitude of almost 17 percent if the working volume is approximately equal to the bellows volume. According to the present invention, it is preferred that the pressure amplitudes be at least five percent. Therefore, the working volume may be as much as 3.4 times the bellows volume. By utilizing improved flexure seals such as disclosed in two of the incorporated disclosures, or by optimizing a flexure seal design using the approach in U.S. provisional patent application Ser. No. 60/445,866, it is envisioned that flexure seal displacements may be able to be increased to as much as 15 percent of their overall length. This allows the working volume to be increased to as much as 5.1 times the bellows volume while still providing a pressure amplitude of five percent. In light of the above, the present invention provides a device wherein the working volume is less than or equal to five times the bellows volume. It is more preferred that the working volume be less than or equal to four times the bellows volume. Three times bellows volume or two times bellows volume is even more preferred.

The various volumes discussed herein, including the multiplier volume 134, the mean volume 144, the working volume, and the bellows flexure volume, may vary, typically oscillating sinusoidally, when the device 110 is operating. However, for definitional purposes, each of these volumes may be said to have a mean or equilibrium volume, which is the volume of each when the device is not operating and is at equilibrium. For example, the bellows volume may be said to have an equilibrium bellows or flexure volume that is equal to the average cross-sectional area and the end-to-end length. During operation, the bellows volume will sinusoidally oscillate above and below the equilibrium volume. The volume fluctuations may be said to oscillate between a peak volume and a minimum volume. The same applies for the multiplier volume 134, the main volume 144, and the working volume.

The device 110 is illustrated with a traditional corrugated-side cylindrical bellows 132. In one preferred embodiment, the bellows is thin metal with convoluted sides. Alternatively, a cylindrical spring with an integral dynamic seal may be used. A design for a cylindrical spring with an integral dynamic gas seal is disclosed in U.S. provisional patent application Ser. No. 60/371,967, and in a co-pending U.S. patent application Ser. No. 10/409,760 filed Apr. 9, 2003, entitled "Cylindrical Spring with Integral Dynamic Gas Seal," the entire contents of both of which are incorporated herein in their entirety by reference. For a metal spring sealed with a low-loss elastomer (such as a cylindrical spring with an integral dynamic gas seal as provided by the incorporated disclosures), the surface area of the cylindrical spring may be three to four times less than a conventional formed metal bellows resulting in a similar reduction in the resonator surface loss shown in FIG. 9.

The present invention may also make use of other types of flexure seals. For the purpose of the present invention, a flexure seal is defined as a member that is at least partially flexible and at least partially blocks (seals) the passage of a gas such as used as a working fluid in a thermoacoustic device. Other examples include a flexure seal that is formed like a vacuum cleaner hose, wherein a reinforcement or spring member may be helically wound in the sidewall, such that under compression of the bellows, the spring resists deflection torsionally. Other flexure seals include devices such as described in U.S. Pat. Nos. 6,461,695; 6,237,922; 5,236,204, and others. Other bellows designs, and any equivalents known to those of skill in the art, also fall into this definition. For purposes of the present invention "flexure" incorporates both bending and torsion, and it does not limit the definition of "flexure seal" to those in which the stresses are bending only. A flexure seal for use with the present invention will typically be generally cylindrical, though they may have sides that are non-straight or non-parallel, such as a truncated cone, and may also be other shapes. They will typically have a pair of ends, one of which is closed off by a reciprocal member, such as a piston, while the other end is closed off by some portion of the remainder of the thermoacoustic device. A flexure seal will surround a volume and, when its ends are closed off, will enclose a bellows volume or flexure volume. In the case of a bellows such as in FIG. 4, the flexure seal may be said to have a pair of ends with a piston closing off one end. The other end lies generally in a plane, with the bellows volume or flexure volume being defined as the volume inside the bellows and between two planes containing the ends of the bellows.

Metal bellows, a cylindrical spring with integral dynamic gas seal, and other flexure seals are normally assumed to have a uniform axial distribution of stiffness, density, convolutions (for bellows) or beams (for the cylindrical spring). U.S. provisional patent application Ser. No. 60/445,866, filed Apr. 9, 2003, also provides for an improved bellows design wherein the bellows or cylindrical spring is produced with a stiffness and/or density that varies monotonically from the fixed end, where it is highest, to the moving end, where it is lowest. The resulting bellows or cylindrical spring can operate at lower stresses, or accept higher piston motion than a comparative bellows of constant stiffness and/or density, resulting in either higher fatigue resistance, potentially lower cost of materials and construction for the bellows, or permits designs with higher power capacity and pressure ratios in a device according to the present invention.

Additional discussion of bellows design is provided in these applications, as well as in the co-pending U.S. patent application filed Apr. 9, 2003, entitled "Compliant Enclosure for Thermoacoustic Devices."

Vibromechanical Multiplier

Execution of the thermoacoustic-Stirling cycle requires that the volume velocity of the working fluid oscillating within the regenerator 114 be substantially in-phase with the pressure oscillations of the working fluid contained within the regenerator. In this embodiment, the vibromechanical multiplier insures this proper phase relationship. The vibromechanical multiplier shown in FIGS. 4–6 is comprised of the multiplier volume 134 contained within the multiplier cylinder 136. One end of multiplier cylinder 136 is sealed to the thermally insulating platform 118 and contains the hot heat exchanger 116. The other end of the multiplier cylinder 136 is sealed by rigid piston or cone 138. A tuned mass element 139 is attached to multiplier piston 138, which is sealed to multiplier cylinder 136 by the flexible edge suspension and seal 140. The vibromechanical multiplier establishes the requisite phase relationship between working fluid pressure within the regenerator 114 and working fluid volume velocity through the regenerator.

As will be clear to those of skill in the art, the multiplier cylinder 136 may have shapes other than cylindrical. It may be more generically referred to as a multiplier chamber, including an oscillating member which is operable to increase and decrease the multiplier volume. In this case, the oscillating member is the piston or cone 138. The oscillating member or piston 138 may also be non-circular, especially in embodiments where the multiplier chamber 136 is non-cylindrical.

The ability of the regenerator to pump heat against a temperature gradient, and thereby produce useful refrigeration power, is dependent upon the proper phasing of the pressure and gas velocity through the regenerator. This exemplary embodiment produces the required phasing by generating an oscillating pressure at the hot-end of the regenerator 114 that is slightly larger and essentially in-phase with the oscillating pressure at the regenerator cold-end. The pressure difference, $\Delta p_1 = p_1^{hot} - p_1^{cold}$, between the hot and cold ends of the regenerator, creates an average volume flow velocity (mass flow) through regenerator 114 of $<U_1>$ that is proportional to that pressure difference and approximately in-phase with the pressure, as required to execute the Stirling cycle [see P. H. Ceperley, "A pistonless Stirling engine—The traveling wave heat engine," J. Acoust. Soc. Am. 66, 1508–1513 (1979)]. The effective flow resistance of the regenerator $R_{reg}$, determines the proportionality constant between the portion of the volume flow rate, $<U_1>$, that is in-phase with the pressure differential across the regenerator $\Delta p_1$.

$$<U_1> \cong \Delta p_1 / R_{reg} \qquad (1)$$

Figure 1:
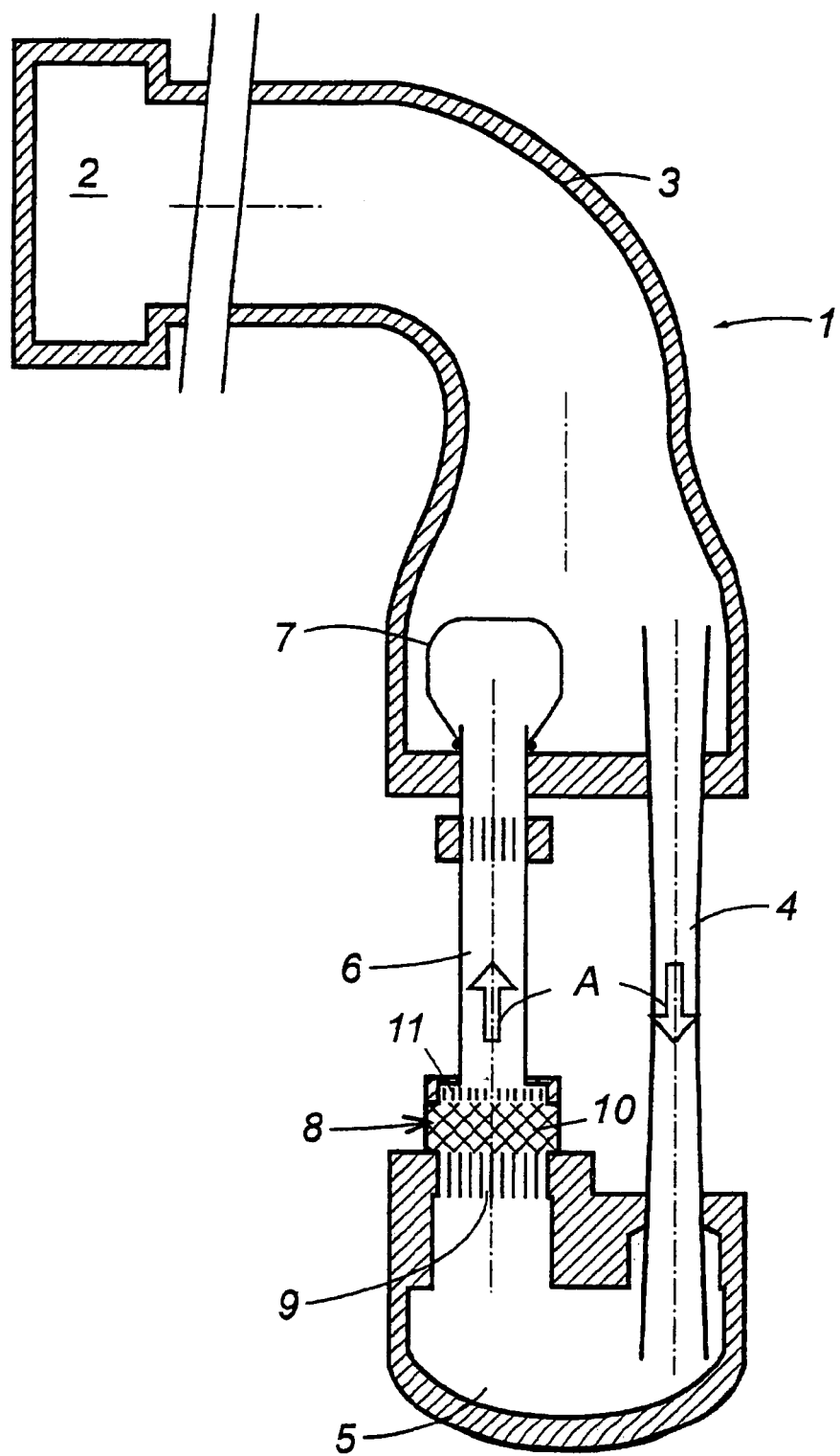
FIG. 1 is a cross-sectional view of a prior art thermoacoustic device.

In the earlier designs such as those presented by Swift (see FIG. 1) or de Blok (see FIG. 2), a gas-filled bypass element formed the neck of a Helmholtz resonator, which adjusted the phase relationship between pressure and flow velocity. In a Helmholtz resonator, the enclosed gas produced a stiffness and the gas moving within a tube that was the "neck" of the Helmholtz resonator provided an inertia. The moving gas, used as the inertial element in the Helmholtz resonator, generates both linear losses in the viscous oscillatory boundary layer and non-linear hydrodynamic losses (minor loss and turbulence) and provided a streaming path for steady gas flow that must be suppressed so that performance is not degraded. The Vibromechanical Multiplier eliminates these deleterious effects (hydrodynamic losses and streaming) by using the multiplier piston or cone 138 with a tuned mass 139, interacting with the stiffness of the gaseous working fluid contained within the multiplier volume 134, to produce a single degree-of-freedom simple harmonic oscillator.

The Vibromechanical Multiplier generates the pressure amplification at the hot end of the regenerator. This multiplier is a simple harmonic oscillator that is operated at a frequency, f, well below its resonance frequency, $f_A$.

$$f_A = \frac{\omega_A}{2\pi} = \frac{1}{2\pi}\sqrt{\frac{k_{gas}}{m_{disk}}} . \qquad (2)$$

The piston or cone 138 with a tuned mass 139 (e.g., a loudspeaker cone with a mass at the apex of a truncated cone) is sealed to the multiplier cylinder 136 by the flexible edge suspension and seal 140. The flexible edge suspension and seal 140 can be an elastomeric structure (typically made from Santoprene™), similar to a loudspeaker surround, or can be made from a thin metallic structure fabricated from low-loss spring steel (e.g., 17-7 precipitation-hardening stainless steel), or any other flexible seal with a very long fatigue life. Together, the piston 138 with the tuned mass 139, and the flexible edge suspension and seal 140, produce a rigid piston assembly with an effective projected area, $A_{disk}$, having the required mass, $m_{disk}$. The inertia of the rigid piston assembly resonates with the stiffness provided by the multiplier volume 134, $V_{mult}$, $$k_{gas} = \frac{\gamma p_m A_{disk}^2}{V_{mult}} . \qquad (3)$$

The gaseous working fluid at mean pressure, $p_m$, with a ratio of specific heat at constant pressure to specific heat at constant volume (polytropic coefficient), $\gamma$, is contained within the multiplier volume, $V_{mult}$.

The gain factor provided by the vibromechanical multiplier, $p_1^{hot}/p_1^{cold}$, is determined by the ratio of the drive frequency, f, of the motor 126, to the multiplier resonance frequency, $f_A \neq f$.

$$\frac{p_1^{hot}}{p_1^{cold}} \cong \frac{1}{1 - \left(\frac{f}{f_A}\right)^2} \qquad (4)$$

This relation is a useful approximation, but it neglects the parallel oscillatory gas flow into and out of the multiplier volume 134 through the regenerator 114.

In alternative designs wherein the piston and multiplier mass are coupled, with rigid or compliant components, as described in the section on alternatives, equation (4) is not appropriate for calculation of ratio of pressures in the main and multiplier volumes. In this case calculation of the pressure ratios can be made directly, based on the changes in volume imposed on the chambers, relative to the non-operating state.

In some embodiments of the present invention, the pressure amplitude in the multiplier volume is approximately six percent higher than the pressure amplitude in the main volume. More or less pressure differential may also be used. While a pressure differential greater than 2% is preferred, pressure differentials of one percent or more may be functional in some embodiments.

Regenerator

The material that forms the regenerator 114 should be a porous solid that has high heat capacity per unit volume and contains many pores. Although a parallel array of pores that provide a straight line-of-sight path along the direction of the acoustic power flow, from the hot to cold end of the regenerator, will produce the best performance, a porous medium made of a stack of woven-wire stainless steel screens or a plug of metal felt or porous sintered metal can serve as a suitable and cost-effective alternative to straight pores. For the purposes of the present invention, "porous" is defined as allowing the passage of the working gaseous fluid through the material. The characteristic dimension of a typical pore is defined s the hydraulic radius, $r_h$. It is determined by the ratio of the pore's cross-sectional area, A, to the perimeter of the pore, $\Pi$, or alternatively, the ratio of the volume of the regenerator to the surface area in contact with the gas. A regenerator generally has characteristic pore sizes wherein the hydraulic radius that characterizes a typical pore is less than the thickness of the thermal penetration depth.

Regenerators must have two somewhat conflicting properties. First, regenerators must have enough heat capacity to anchor the temperature of the oscillating gas to the regenerator temperature. Only the gas within a fraction of the thermal boundary layer, $\delta_\kappa$, of the regenerator material can be held close to the regenerator temperature. The thermal penetration depth, $\delta_\kappa$, in the gas is determined by the thermal conductivity of the gas, $\kappa$, the gas specific heat at constant pressure, $c_p$, and the gas mass density, $\rho$.

$$\delta_\kappa = \sqrt{\frac{\kappa}{\pi f \rho c_p}} \qquad (6)$$

The designer must put enough material into the regenerator space so that all of the gas is contained well within the thermal boundary layer. A hydraulic radius, $r_h$, characterizes the physical dimension of the regenerator pores. For a pore of effective cross-sectional area A and effective perimeter $\Pi$, the hydraulic radius is given by the ratio of that area to that perimeter, $r_h = A/\Pi$. Regenerator 114 requires that the hydraulic radius of the pores is substantially smaller than the thermal penetration of the working fluid, $r_h < \delta_\kappa$.

However, the introduction of this much material into the high amplitude acoustic wave causes substantial viscous loss from the friction of the gas scrubbing along the regenerator material. The thickness of the viscous boundary layer, $\delta_v$, is related to the thermal boundary layer thickness, $\delta_\kappa$, by the square-root of the Prandtl number, $\sigma$: $\delta_\kappa/\delta_v = \sqrt{\sigma}$. For pure gases, $\sigma \cong 2/3$, so the viscous and thermal effects take place over distances that are practically equal for both effects. The non-zero thermal conductivity of the regenerator material also degrades regenerator performance because it allows heat to flow from the hot end to the cold end.

In this exemplary embodiment, a good three-way compromise between low viscous flow resistance, high regenerator heat capacity, and low axial thermal conductivity has been found with the use of a stacked pile of stainless steel screens. The stainless steel is not highly thermally conductive, and the conductivity in the axial direction is further diminished due to the large thermal contact resistance between each layer of woven screen. However, the stainless steel regenerator material has sufficient heat capacity, even when saturated with pressurized helium gas, that it does a good job of forcing the gas to the local regenerator temperature. Although the flow resistance is not particularly low in a screen bed, the immediate availability and good thermal properties make the stacked screen regenerator a convenient choice for this exemplary embodiment. Furthermore, there are experimental correlations and experience with stacked screen regenerators. Although other regenerator materials might further improve performance, for this embodiment, a stack of stainless steel woven screens will be assumed.

Hot Heat Exchanger

The heat that is pumped from the cold end of the regenerator to the hot end of the regenerator, along with the acoustic power absorbed by the regenerator that is required to pump that heat, is deposited on the hot heat exchanger to be exhausted from the system. For this preferred embodiment, the hot heat exchanger 116 is comprised of a commercially available (from Thermalex, Inc., Montgomery, Ala. 36109) plurality of parallel flat aluminum tubes 164 (best shown in FIG. 7) that are extruded to include multiple parallel fluid flow channels within the tube. The parallel flat aluminum tubes 164 are joined in a leak-tight manner to the inlet manifold 156 and the outlet manifold 158 using an adhesive bonding agent, such as an epoxy, or by furnace brazing, as is normally practiced by commercial manufacturers of radiators used in the automotive industry. If an adhesive bonding technique is used, separate manifold lids 159 can be attached after multiple tubes 164 have been joined to the inlet manifold 156 and the outlet manifold 158. If furnace brazing is used, the lid 159 can be an integral part of the inlet manifold 156. A three dimensional rendering of a portion of the hot heat exchanger 116 showing several flat aluminum tubes 164, and some gas-side fins 142 of the unitized cold head heat exchanger 112, is provided in FIG. 7.

The hot heat exchanger 116 has excellent thermal properties and it should be easy to fabricate in mass production. It may use the same technologies as currently available for mass production of automotive radiators, except that it requires no fin material that would ordinarily be placed between the tubes for the automotive radiator application. Closely spaced, individual flat extruded aluminum tubes 164, with multiple internal parallel fluid flow channels are commercially available at competitive prices. Their variety in width, length and thickness make it possible to optimize the hot side exhaust heat removal for a wide range of design parameters, operating temperature spans, and required useful heat pumping capacities.

Unitized Cold Head Heat Exchanger

The cold-side heat exchanger 112 is responsible for delivery of the useful heat load extracted from a source outside the pressure vessel boundaries to the cold side of regenerator 114. With the warm portions of the chiller's thermal core (regenerator 114 hot-end and hot-side heat exchanger 116) disposed within the vibromechanical multiplier volume 134, there is complete freedom for the design of the cold-side heat exchanger that is placed in contact with the cold gaseous working fluid oscillating in and out of the cold-end of the regenerator 114. The design flexibility allowed by this approach provides a path of low thermal resistance between the cooling-power produced at the cold-end of the regenerator 114 contained within the pressure vessel, and the heat load being cooled by the chiller that is typically located outside the pressure vessel. This approach to providing a cold-side heat exchanger, using a unitized cold head heat exchanger 112, also eliminates the need for fluid flow through the cylindrical pressure vessel wall 122 to access the cold side of the regenerator. This approach also permits direct utilization of the cooling power, possibly without any secondary fluid, to couple to the air in an ice cream cabinet, bottle cooler, beverage vending machine or other suitable heat load, or to couple directly to an electronic "chip," which was the goal of a previous design that did not utilize the present approach for thermoacoustic refrigeration [see G. M. Chrysler and D. T. Vader, "Electronics package with improved thermal management by thermoacoustic heat pumping," U.S. Pat. No. 5,303,555].

The unitized cold head heat exchanger 112 functions both as a pressure vessel boundary and as the cold-side heat exchanger. Additionally, in the illustrated embodiment of FIG. 4, the cold head heat exchanger 112 defines one end of the housing for the device 110. Therefore, there is nothing positioned so as to be in the way of utilization of cooling directly from the cold head 112. Essentially, the unitized cold head heat exchanger serves as both a heat exchanger, as part of the thermal components of the thermoacoustic device, and also provides the function of an external heat exchanger which would be used to provide cooling power to a remote cooling load. Preferably, the cold head heat exchanger 112 is fabricated from a single piece of metal to allow thermal communication between the interior and exterior surfaces, and also to allow it to serve as part of the pressure vessel boundary.

This design allows thermal access to the gaseous working fluid cooled by the cold-end of the regenerator 114 and an efficient heat transfer surface at atmospheric pressure that can be used to deliver the chiller's cooling power to a secondary heat transfer surface. That secondary heat transfer surface can also be used to provide the condensation surface for a heat pipe or thermosyphon. As shown in FIG. 5, the secondary heat transfer surface may be a fluid-side finned section 166 for contact to a cold-side secondary heat transport fluid (such as ethanol). The lower or inner surface of the cold head may be a gas-side finned section 142, as shown in FIG. 7, which is in contact with the gaseous helium working fluid at the cold side of the regenerator 114. In this way, the cold head provides direct cooling to the surrounding air by either forced or free convection, or may have the heat source to be cooled (e.g., computer chip) attached directly to the unitized cold head heat exchanger 112. In the illustrated embodiment, the secondary heat transfer surface is a finned section 166 positioned adjacent an exterior cover 168. The cover 168 is sealed to the cold head 112 with a cold-side secondary heat transfer fluid, such as ethanol, trapped between the lower side of the cover 168 and the finned section 166. Therefore, heat is siphoned from the cover 168 to the cold head 112. Alternatively, the cold head 112 may have a finned outer surface in direct contact with the exterior area to be cooled. As yet another alternative, a traditional heat exchanger may be provided with fluid inlets and outlets so as to remove heat from a remotely located heat source.

Orthogonally-Finned Heat Exchanger Pair

The directions of the fins on the gas side of the unitized cold head heat exchanger and the direction of the flat tubes used in the hot heat exchanger are preferably chosen to be perpendicular. This orientation helps to suppress the formation of streaming circulation cells within the regenerator. Further the directions of the fins on the gas side of the unitized cold head heat exchanger are preferably chosen to be perpendicular to the direction of the fluid-side fins of the unitized cold head heat exchanger to provide additional strength and rigidity to the unitized cold head that also acts as a pressure vessel boundary. This aspect of the present invention may be extended to other applications wherein hot and cold heat exchangers both have fluid filled tubes or are both fins. Generically, the fins or tubes may be referred to as heat transfer elements. Therefore, this aspect of the present invention may be more broadly stated as a first heat exchanger having a plurality of generally parallel heat transfer elements lying in a first plane and a second heat exchanger having a second plurality of generally parallel heat transfer elements in a second plane. The two planes are generally parallel to each other and the first plurality of heat transfer elements are aligned in a first direction, while the second plurality of heat transfer elements is aligned in a second direction, with the two directions being different. Preferably, the two directions are perpendicular to one another.

Control Systems

As will be clear to those of skill in the art, some type of control system is typically required to control the linear motor 126 for optimal operation of the device 110. Since the motor converts electricity to mechanical energy most efficiency when the system is driven at resonance, some mechanism to adjust the driving frequency to keep the system at or near mechanical resonance is desirable. As the temperature of the working gas, such as helium, enclosed in the pressure vessel changes with changing environmental conditions or refrigeration load, the stiffness of the gas will change and therefore the resonance frequency of the system will change.

Most thermoacoustic refrigerators incorporating prior art are strongly coupled two degree-of-freedom systems with a motor mass representing one degree of freedom and the gas inertia representing the other degree-of-freedom. Consequently, there are two modes, or resonance frequencies to these systems. The above-described system, on the other hand, may be modeled as a single degree-of-freedom system (in mechanical terms, a driven mass attached to ground through a spring). While it is true that the vibromechanical multiplier acts as another degree-of-freedom, it is coupled rather weakly to the dominant power piston mass and bellows gas spring.

In a traditional system, where there are two degrees-of-freedom, it is often desirable to make the natural frequencies as close as possible to each other (a so called "co-resonance"). Then, the most efficient frequency of operation is roughly the average of these resonant frequencies. This operating frequency minimizes the amount of reactive impedance seen at the driver terminals [see R. S. Wakeland, "Use of electrodynamic drivers in thermoacoustic refrigerators," J. Acoust. Soc. Am. 107(2), 827–832 (2000)]. Not only is there an optimum frequency in terms of minimizing the reactive part of the load, but there is also an optimum real mechanical load presented to the driver by the resonator. This real load is a strong function of frequency also, and consequently the frequency tracking in thermoacoustic machines to date must find an optimum frequency that maximizes efficiency by providing the best mechanical load match while minimizing the reactive load presented to the motor. This is difficult to accomplish without the use of sensors.

The present system is much simpler, since the real part of the mechanical load is not a strong function of frequency and the system behaves as though it has only a single degree of freedom. This simplicity allows the designer to neglect finding the tradeoff of optimum real mechanical load, and instead only control frequency to minimize the reactive part of the impedance of the power piston.

Figure 8:
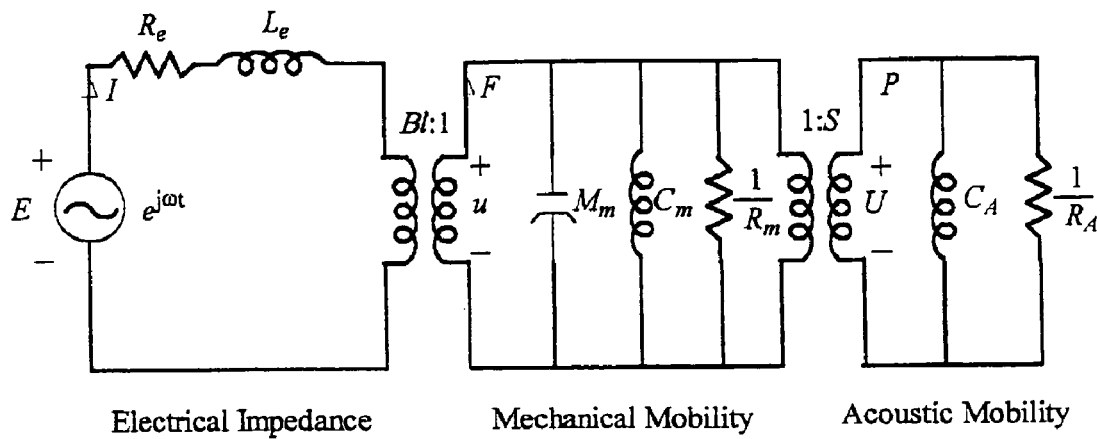
FIG. 8 is a diagram showing a model of one embodiment of a thermoacoustic device according to the present invention.

A perfect solution would still require finding the frequency that trades the correct mechanical load with minimizing reactive impedance, but neglecting the real load optimization part does not sacrifice much in efficiency in the above-described design. Therefore a cost-effective frequency control circuit may incorporate a phase sensitive Wheatstone bridge circuit that neglects the resistive part of the electrical load at the motor terminals. Shown in FIG. 8 is an equivalent circuit of the present system, which provides a schematic representation of the electrical, mechanical, and acoustic segments of the refrigerator.

The schematic shows the electrical resistance ($R_e$) and inductance ($L_e$) of the motor on the left, the mechanical mass ($M_m$), compliance ($C_m$) and mechanical resistance ($R_m$) of the motor in the center, and the compliance ($C_A$) of the gas enclosed in the bellows and the hydro-thermodynamic loss ($R_A$) of the gas in the thermal core on the right. The total impedance to this system can be expressed as $$Z_e = \frac{E}{I} = R_e + j\omega L_e + \frac{(Bl)^2}{R_m + j\omega M_m - j\frac{1}{\omega C_m} + \text{Re}\{Z_A\} + \text{Im}\{Z_A\}},$$

wherein $Z_A$ represents the acoustic section of the circuit transformed into acoustic impedance.

With no consideration to the frequency dependence of the real part of $Z_e$ (which is not a strong function of frequency), the optimum frequency of operation for the present design occurs where the imaginary part of $Z_e$ is equal to $\omega L_e$, the inductive reactance of the motor windings. This is the operating frequency that makes the impedance of the mechanical-acoustical part of the system entirely real; hence, the magnitude of the quadrature component of $Z_e$ is equal to $\omega L_e$.

Since $L_e$ is a measurable parameter of the motor, it is an easy matter to conceive of numerable ways to measure the magnitude of the quadrature component of the electrical impedance at the motor terminals, compare that signal of a known frequency to the known value of the product $\omega L_e$ and then adjust $\omega$ to match the target value. One way using analog electronics is to create a phase-sensitive Wheatstone bridge circuit using the induction of the motor windings as one leg of the bridge and a fixed inductor as another leg. The error signal generated when the bridge is unbalanced can be integrated and fed back to a voltage-controlled oscillator that determines the drive frequency for the motor.

In larger devices, or different designs, where the highest efficiencies might justify additional complexity, or for control of operation at off optimal design operating points, it is possible to use the methods described in a pending patent application titled "Sensorless Control of a Harmonically Driven Leinear Reciprocating Electrodynamic Machine", U.S. Provisional Patent Application Ser. No. 60/426,048, filed Nov. 12, 2002, the entire contents of which are incorporated herein by reference, to select the optimal operating frequency.

Vibromechanical Multiplier Power Flow

As discussed earlier, in a Helmholtz resonator, the enclosed gas produces the resonator's stiffness and the gas moving within a tube that is the "neck" of the Helmholtz resonator provides the inertia. The moving gas acting as the inertial element generates non-linear hydrodynamic losses and provides a streaming path for steady gas flow. The Vibromechanical Multiplier of the present invention eliminates both of those effects (nonlinear loss and streaming) by using a rigid disk or piston 138 with a tuned mass 139 interacting with the gas contained within the multiplier volume 134. The low loss performance of this phasing network is evident from the power flow diagram in FIG. 9.

Figure 9:
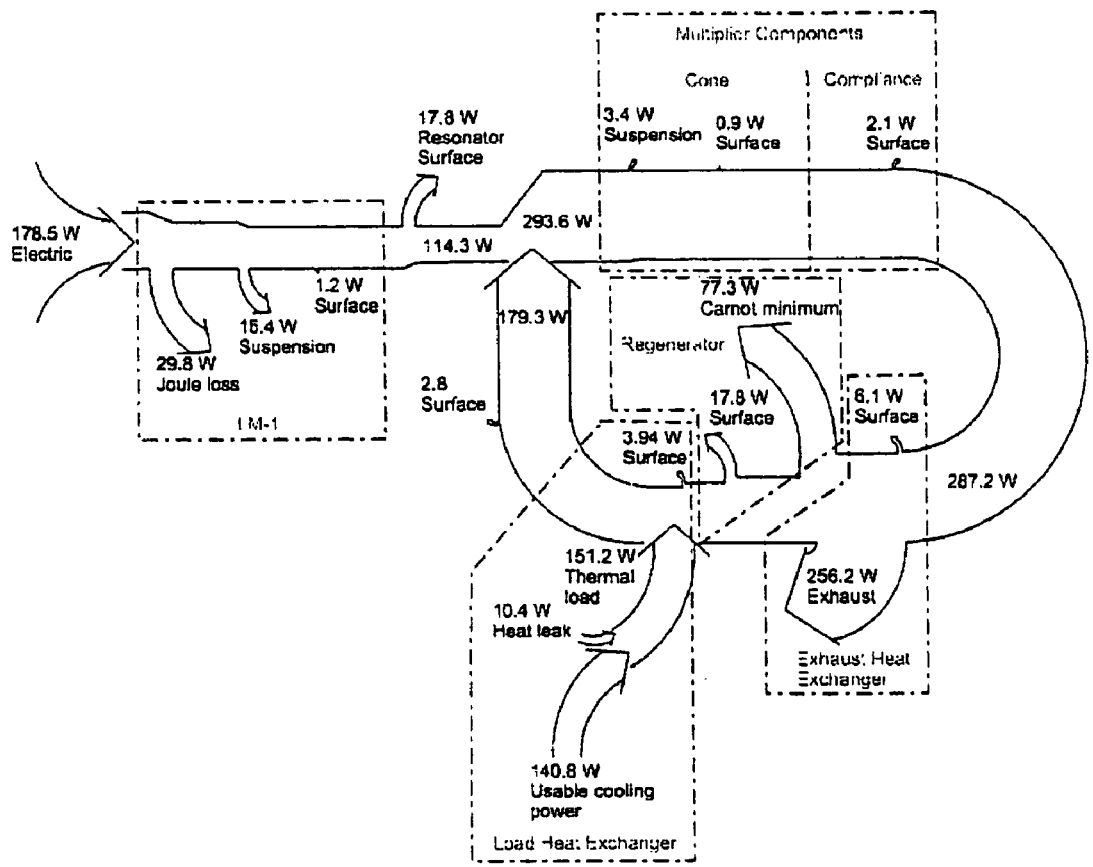
FIG. 9 is a diagram showing the energy flow in a first preferred embodiment of the thermoacoustic device according to the present invention.

FIG. 9 illustrates a power flow diagram for one implementation of the exemplary embodiment. The powers shown in the diagram were based on a DELTAE computer model. Losses in the Vibromechanical Multiplier elements, here labeled "cone", comprised of the rigid disk 138 and its flexible edge suspension and seal 140, with the tuned mass 139, and "compliance", comprised of the multiplier cylinder 136, which defines multiplier volume 140, constitute only a very small fraction (3.6%) of the input electrical power.

The Vibromechanical Multiplier also simplifies correct tuning of the multiplier by use of a tuned mass. It also contains the warm gaseous working fluid which surrounds the hot heat exchanger 116 within the multiplier volume 134 and thermally insulates it from the cooler gaseous working fluid in the space internal to bellows 136 and external to multiplier cylinder 136 and rigid piston assembly 138.

Exemplary Dimensions

As will be clear to those of skill in the art, a device according to the present invention may be constructed having a variety of dimensions and configurations. Exemplary dimensions for one working embodiment of the device of FIG. 4 will now be given. In this exemplary embodiment, the pressure vessel 120 has a top-to-bottom height of approximately 13½ inches, and an exterior diameter of approximately 9 inches. The pressure vessel 122 is generally cylindrical, with an interior diameter of approximately 8½ inches. The flexure seal 132 is a metal bellows with an outside diameter of 7 inches and an inside diameter of 6 inches, and an equilibrium length of 7 inches. Therefore, this gives a flexure volume of approximately 200 in$^3$. The piston 128 is generally circular with a diameter of 7 inches. As shown, the piston is shaped like a truncated cone, and displaces approximately 30 in$^3$ volume as compared to a flat piston of negligible thickness. The multiplier cylinder 136 is generally cylindrical with a height of approximately 4 inches and an inside diameter of approximately 4¾ inches. The hot heat exchanger 116 extends somewhat downwardly into this cylinder 136, and is a parallel fit fluid-type heat exchanger. The multiplier cone 138 has a diameter of approximately 4½ inches and is generally circular in cross-section. The support 118 has a thickness of approximately 1¼ inches, while the cold head 112 has a thickness of approximately 1½ inches. The fins 142 have a height of approximately ½ inch, are spaced apart by approximately 0.03 inches, and have a thickness of 0.05 inches. The cold head 112 is preferably machined from aluminum or other material with high thermal conductivity. A total of approximately 45 fins are provided. The fins on the secondary heat transfer surface have a height of approximately ½ inch, a width of 0.05 inches, and are spaced apart by 0.03 inches. A total of 50 fins are provided. The working volume of the device 110 is filled with helium gas at a pressure of approximately 10 atmospheres (150 psia). The motor 126 oscillates the piston 128 at a frequency of approximately 100 Hz. During operation, the pressure amplitude in the multiplier volume 134 is approximately six percent higher than the pressure amplitude in the main volume 144. The regenerator 114 is a stack of over 200 stainless steel wire mesh with a hydraulic diameter, $r_h \approx 40$ micrometers and an overall thickness equal to that of the support 118 (1¼ inches) and a cross-sectional area of 12 in$^2$.

Alternative Embodiments

Figure 10:
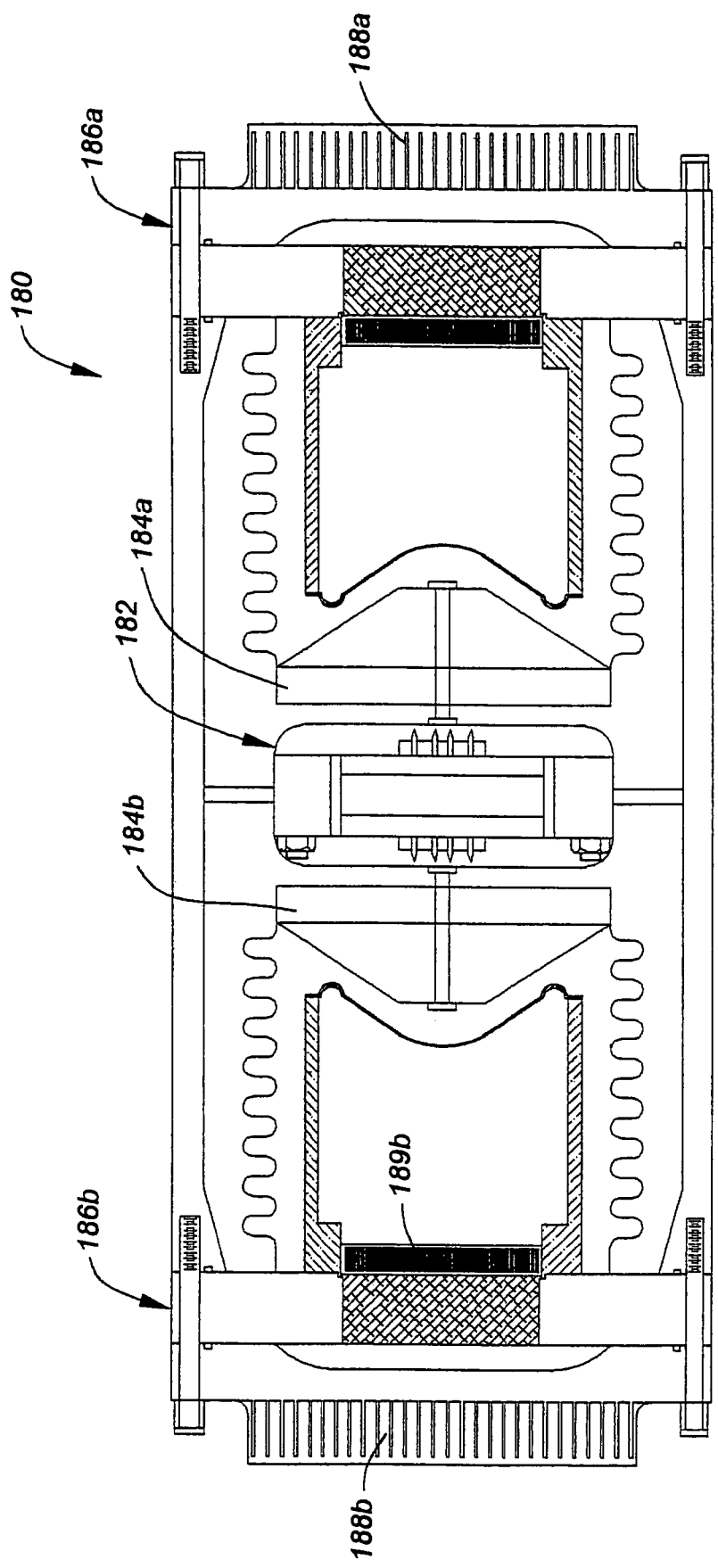
FIG. 10 is a cross-sectional side view of a second preferred embodiment of a thermoacoustic device according to the present invention.

Various aspects of the previously discussed preferred embodiment of the present invention may be incorporated into other thermoacoustics devices. FIG. 10 illustrates an alternative embodiment of a thermoacoustic refrigeration device 180. The device 180 is a symmetrically doubled device with a central linear motor 182 driving a pair of power pistons 184a and 184b. This design may be used to provide more cooling power, or may be used as a cascaded design wherein the heat exchanger at one end of the device 180 is used to cool the exhaust heat exchanger from the other end. Alternatively, the two ends may be optimized for different cooling temperatures, allowing one end to cool a freezer section and the other part to cool the fresh fruit section of a conventional domestic or commercial refrigerator/freezer. In the illustrated embodiment, the cold head heat exchangers 186a and 186b have exposed cooling fins 188a and 188b for direct cooling of air exposed to the fins 188a and 188b. Otherwise, the internal components of the device 180 are substantially the same as the components in the previously discussed embodiment.

Figure 11:
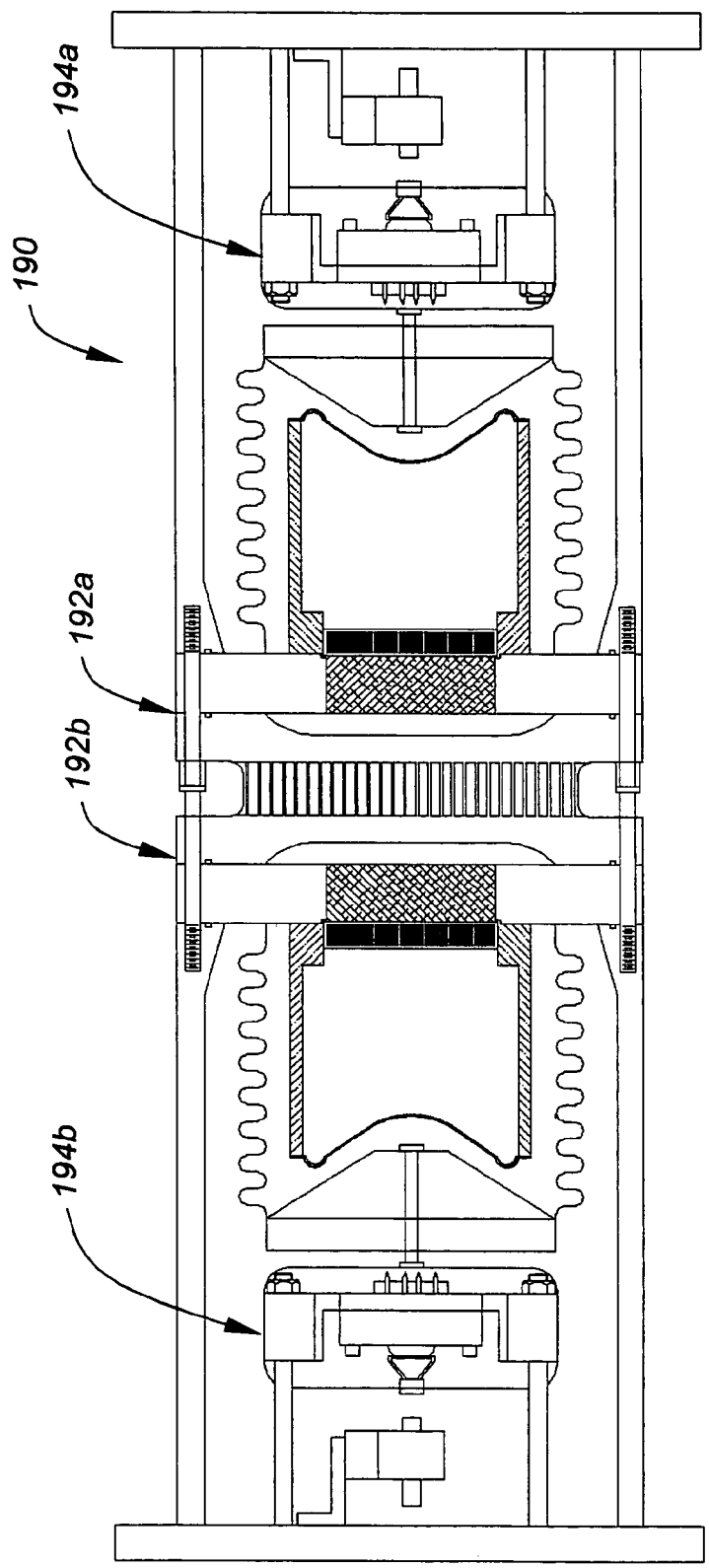
FIG. 11 is a cross-sectional side view of a third preferred embodiment of a thermoacoustic device according to the present invention.

FIG. 11 illustrates another alternative embodiment of a thermoacoustics device 190. This device is again symmetrically doubled, but both halves are flipped such that the cold heads 192a and 192b are joined at the center of the device 190. Unlike the device 180 of FIG. 10, the device 190 utilizes a pair of motors 194a and 194b. The device 190 allows the output of more cooling power and provides some vibration cancellation. Also, because the static and dynamic pressure forces on the cold head heat exchanger, formed by the combination of 192a and 192b, are now also balanced, many structural requirements for the cold head heat exchanger are relaxed allowing further optimization of its heat transport function.

Reversibility

All of the designs disclosed herein are functionally reversible. By applying heat at high temperature to the unitized cold head heat exchanger, acoustic power will be generated that will cause the power piston to oscillate. The motion of the power piston can be coupled by a rigid shaft to the "linear motor" that will then function as a "linear alternator" generating electrical power. Also, while the thermoacoustic devices described herein have been generally described as refrigerators, they may also function so as to provide heat, rather than to provide cooling power. Generically, the devices may be referred to as a heat pump, whether they provide cooling power or heat.

Heat Driven Embodiment

Figure 12:
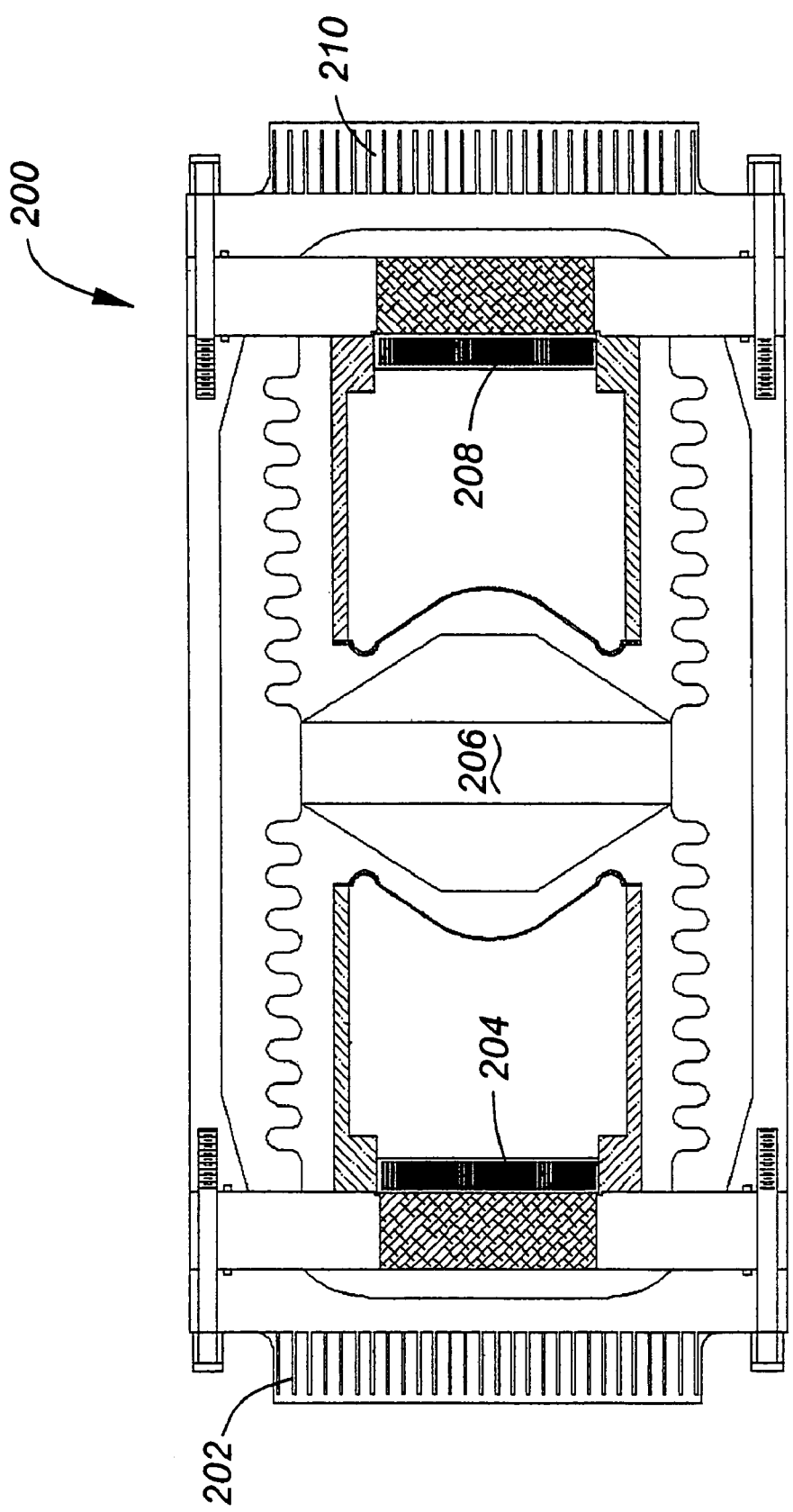
FIG. 12 is a cross-sectional side view of a fourth preferred embodiment of a thermoacoustic device according to the present invention.

The embodiments of the present invention discussed thus far have used an electric motor to provide the driving power of the device. Alternatively, acoustic energy generated by one device may be utilized by a second device. FIG. 12 illustrates an embodiment of a device 200 having a heat input and a cold output end. In the embodiment of FIG. 12, heat may be added to heat exchanger 202 and exhausted from heat exchanger 204. This creates oscillating acoustic waves, which move piston 206. Piston 206, in turn, may be used to drive the right end of the device 200. Then, if heat is exhausted from heat exchanger 208, a cooling load may be applied to heat exchanger 210. The heat exchangers 202, 204, 208, and 210 may be configured differently than illustrated. For example, the heat exchangers 202 and/or 210 may be constructed as traditional heat exchangers rather than the "cold head" design discussed with respect to previous embodiments. Preferably, the piston 206 is supported in some manner to allow oscillatory linear motion.

Referring again to FIG. 10, the thermoacoustics device 180 may also be used as a heat driven device. In this example, heat may be provided to heat exchanger 188B and exhausted from heat exchanger 189B. This will then create oscillatory sound waves which will drive the piston 184B. Because piston 184B is connected by a common shaft to piston 184A, the right half of the device is then driven by the left half. Excess power may be extracted using the motor 182 as an alternator. Alternatively, the motor may be used to supplement the power from the heat driven end or to provide all of the power needed by the right end in the absence of a heat input.

Bellowless Designs

Figure 13:
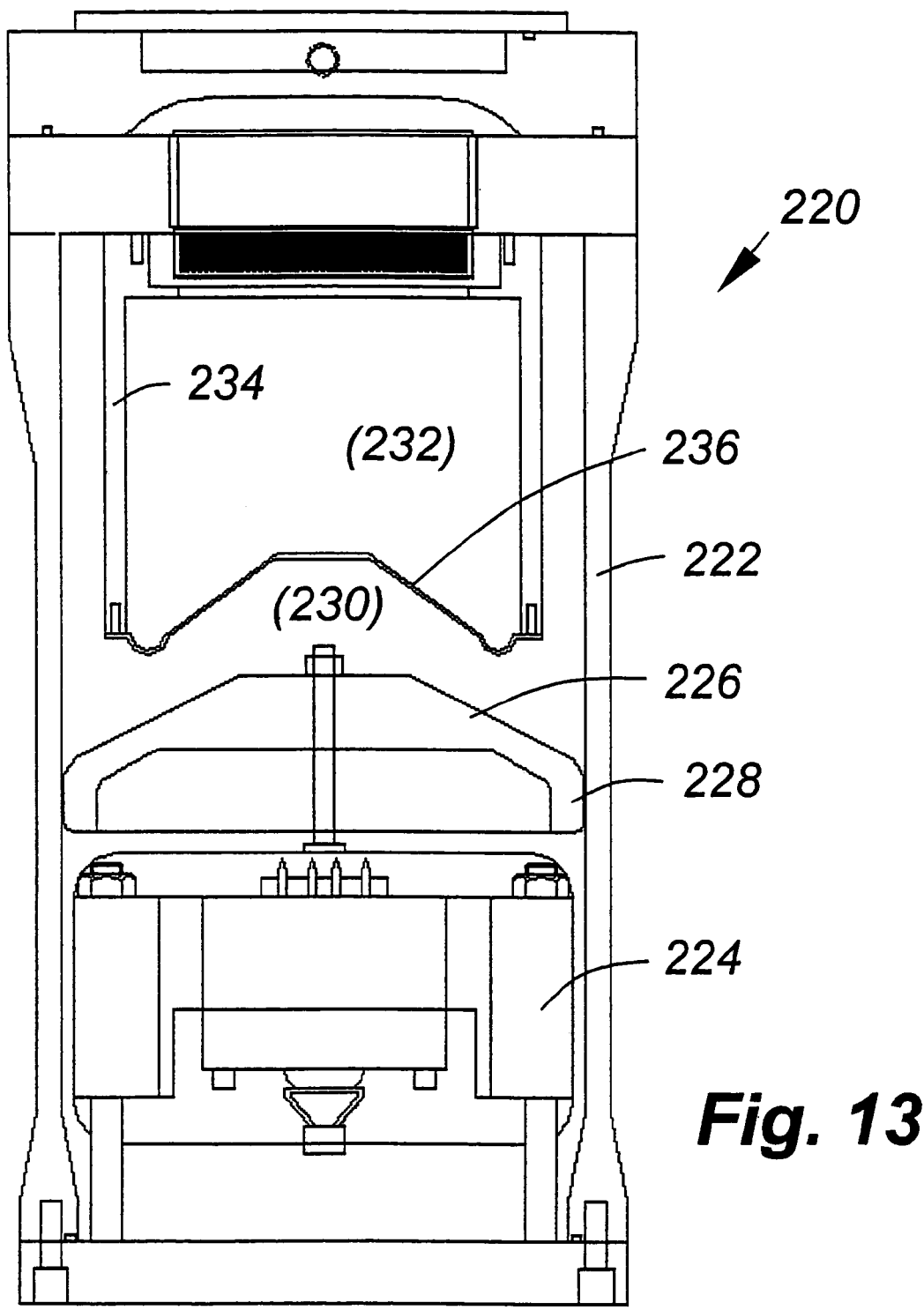
FIG. 13 is a side elevational view of a fifth preferred embodiment of a thermoacoustic device according to the present invention.
Figure 14:
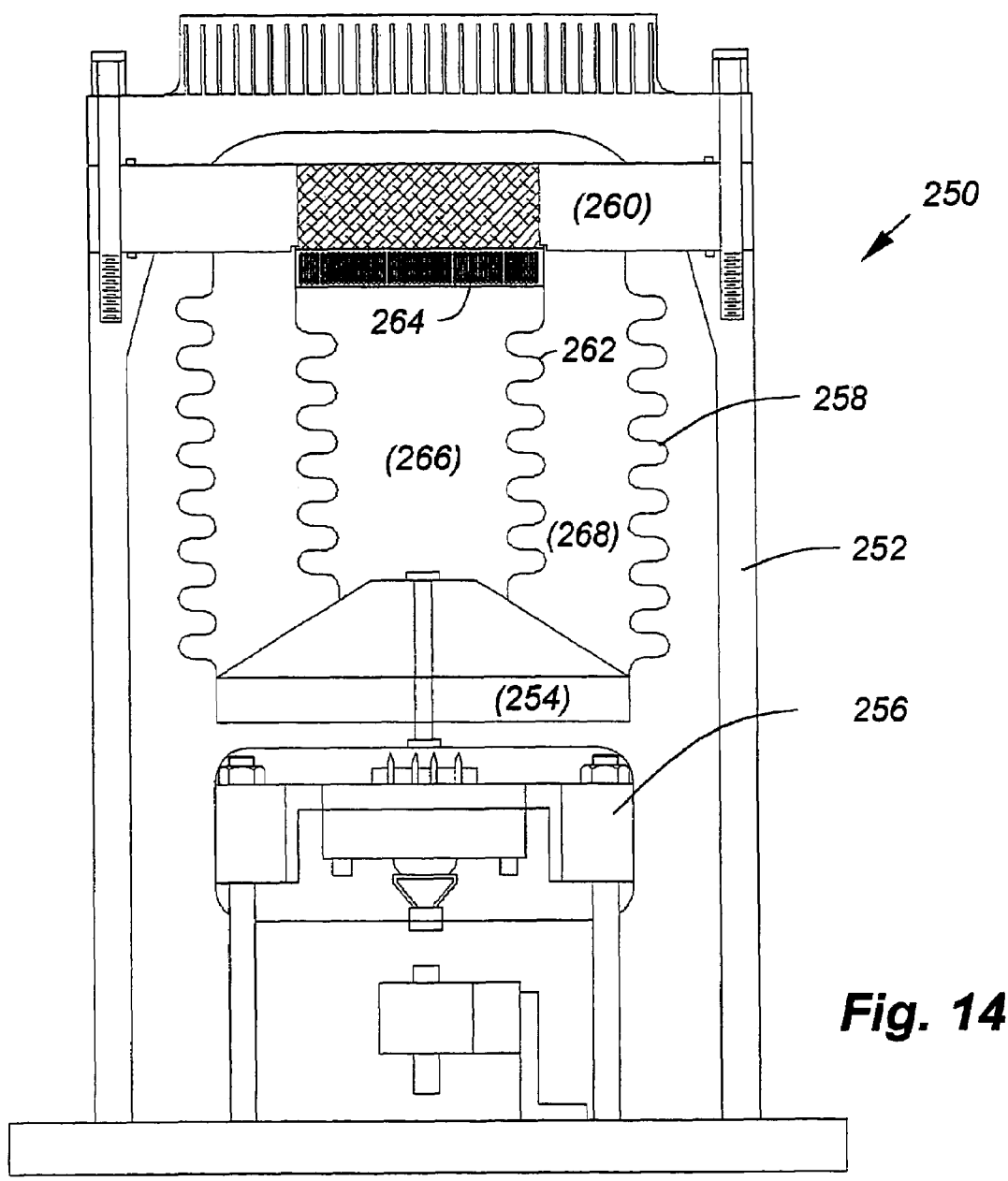
FIG. 14 is a side elevational view of a sixth preferred embodiment of a thermoacoustic device according to the present invention.

The thermoacoustic devices described thus far have all made use of compliant enclosures in accordance with U.S. patent application Ser. No. 60/372,008 and the co-pending patent application Ser. No. 10/409,855 entitled "Compliant Enclosure for Thermoacoustic Devices." However, the present invention is not limited to the use of compliant enclosures. Instead, a clearance seal approach may be used. FIG. 13 illustrates a thermoacoustic device 220. The device 220 includes a pressure vessel 222 with a linear motor 224 mounted at one end. The motor is interconnected with a piston 226 which is closely fitted into the interior diameter of the sidewalls of the pressure vessel 222. A radial seal 228 is provided between the sides of the piston 226 and the walls of the pressure vessel 222. As known to those of skill in the art, the radial seal may include a clearance seal, a dynamic O-ring, or other approaches. A main volume 230 is defined inside the walls of the pressure vessel 222 and above the piston 226. A multiplier volume 232 is defined inside of a multiplier chamber 234 and above a multiplier member or piston 236. While the multiplier piston 236 is shown as being sealed to the remainder of the multiplier chamber 234 using a flexible edge seal, it may alternatively also use a radial seal, such as a clearance seal, a dynamical ring, or other approaches. Alternatively, the multiplier chamber 234 may have a flexure seal forming part or all of its sidewall, such as shown in FIG. 14. As will be clear to those of skill in the art, a designer of a thermoacoustic device may choose to "mix and match" flexure seals, edge seals, radial seals, and any other approaches to oscillating the volume and pressure of the main chamber and multiplier chamber in any of the various embodiments herein. The device 220 operates in a manner similar to the embodiment of FIG. 4 with respect to the heat exchanger and regenerator designs.

Interconnected Main and Multiplier Pistons

As discussed previously, the power piston 128 and multiplier cone or piston 138 in the device 110 of FIG. 4 preferably moves substantially in phase with one another. In an alternative embodiment, the main power piston 128 and multiplier piston 138 may be interconnected so as to force them to move in phase and to have identical displacements. This may be accomplished by providing a rigid member interconnecting the two pistons 128 and 138. Alternatively, a compliant member may interconnect the pistons 128 and 138. This compliant member may be a flexible piece of material such as plastic or rubber, or a spring made out of a material such as plastic or metal.

FIG. 14 presents an alternative approach to an interconnection between the pistons. FIG. 14 provides a thermoacoustic device 250 having a pressure vessel 252 with a power piston 254 disposed therein. A linear motor 256 is attached to the power piston 254 and is operable to oscillate the piston 254. An outer bellows 258 extends from the power piston 254 to the support 260. An inner bellows 262 is positioned inside and co-axial with the outer bellows 258. The inner bellows 262 has its lower end sealed to the power piston 254 and its upper end sealed to the support 260 so as to enclose the hot heat exchanger 264. As will be clear to those of skill in the art, the embodiment of FIG. 14 functions similar to the embodiment of FIG. 4 in that the smaller multiplier volume 266 provides pressure waves to the thermal core that are in phase with, and slightly larger than, pressure waves from the main volume 268. For definitional purposes, the multiplier volume 266 is enclosed by the inner bellows 262 and a portion of the power piston 254, which may also be referred to as an oscillating member. The main volume 268 may be said to be enclosed between the outer bellows 258 and the inner bellows 262, and a portion of the power piston 254. Again, this portion of the power piston may be considered to be an oscillating member. In this case, the two oscillating members may be considered to be integral with one another.

It is also possible with interconnected main and multiplier pistons to produce an arrangement such that the pressure amplitude in the multiplier volume is smaller than the pressure amplitudes in the main volume. For such embodiments, similar differences in pressure amplitudes are favored, and pressures in the two chambers are substantially in phase. The direction of gas flow through the regenerator for such an arrangement is reversed from embodiments in which the multiplier chamber pressure amplitude is higher. As such, for this type of embodiment the hot and cold heat exchanger locations are reversed, so that the cold heat exchanger has a surface bounding the multiplier volume, and the hot heat exchanger now bounds the main chamber volume.

Unfolded Embodiment

Figure 15:
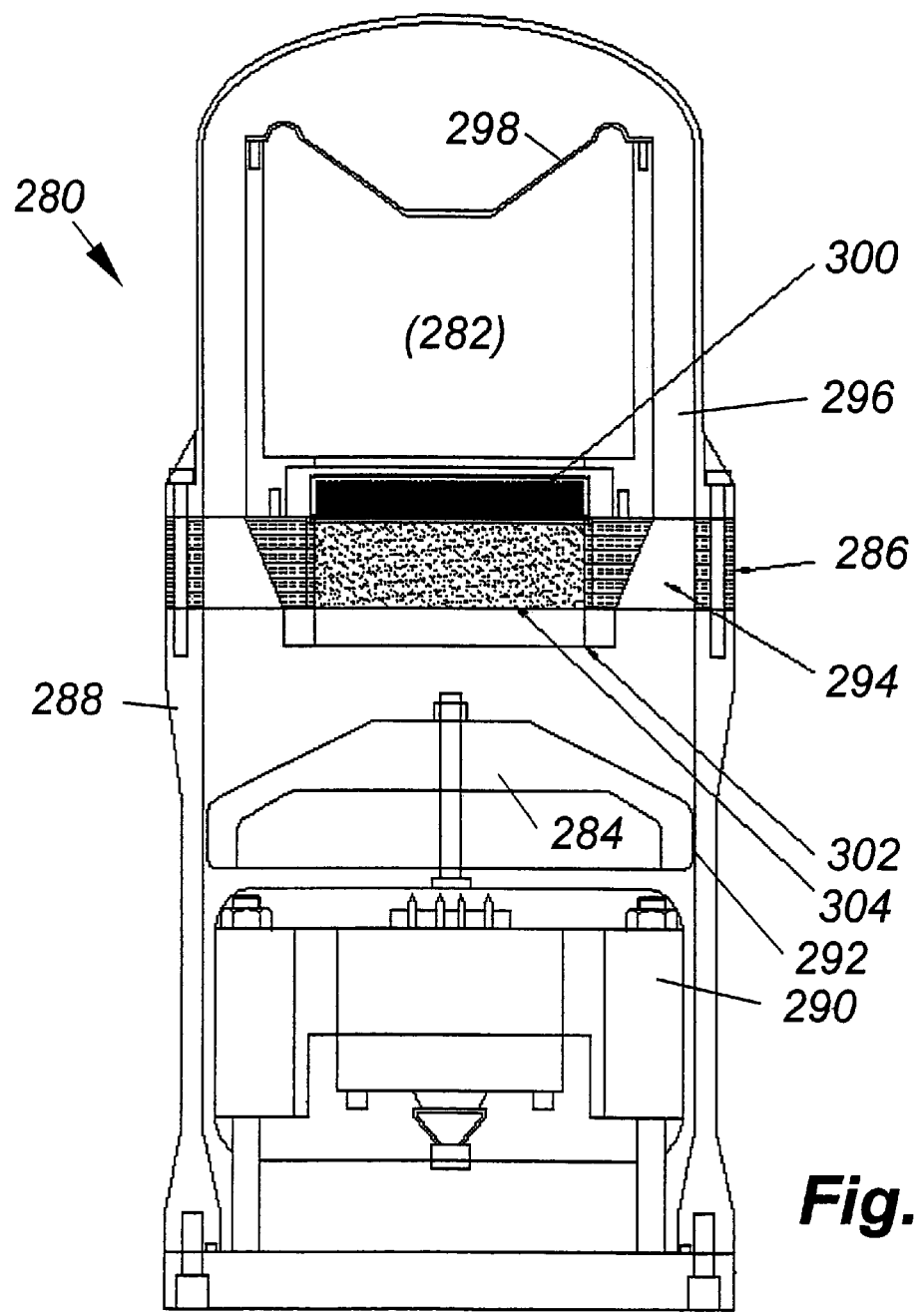
FIG. 15 is a cross-sectional side view of a seventh preferred embodiment of a thermoacoustic device according to the present invention.

FIG. 15 provides a thermoacoustic device 280 wherein the multiplier volume 282 is not positioned between the piston 284 and the support 286. Instead, the multiplier volume 282 is on the other side of the support 286. As shown, the device 280 has a pressure vessel 288 with a linear motor 290 positioned in the lower end. The linear motor oscillates the power piston 284, which is a clearance seal design, with a clearance seal 292 at the perimeter of the piston 284. Alternatively, a compliant enclosure design may be used, wherein a bellows extends between the piston 284 and the support 286. Passages 294 are defined through the support 286 to allow fluid communication between the upper and lower halves of the device 280. The multiplier volume 282 is housed inside of a multiplier cylinder 296 that is closed at its upper end by a multiplier piston 298. The hot heat exchanger at 300 is adjacent to, and may be housed in, the multiplier volume 282. As shown, the hot heat exchanger may be on the top side of the support 286. The cold heat exchanger 302 is positioned on the lower side of the support 286 with the regenerator 304 positioned therebetween. Unlike with the previously discussed designs, the cold heat exchanger 302 is not positioned so as to be partially external to the pressure vessel 288. Therefore, the cold heat exchanger 302 is more traditional in design, with heat exchanged fluid being moved to and from the heat exchanger 302.

Additional Alternatives

The above discussed embodiments of the present invention may be altered in various ways. As one example, many of the embodiments may dispense with the pressure vessel, with the bellows or flexure seal instead serving to contain both the dynamic and static pressure of the working fluid. As another alternative, some of the components of the various embodiments illustrated herein may be combined or integrally formed, or may be provided in additional, smaller pieces. As one example, the support 118 in the embodiment of FIG. 4 may be integrally formed with, or considered to be part of, the cold head heat exchanger 112. Then, the cold head heat exchanger may be considered to have passages with the regenerator and/or hot heat exchanger disposed therein. As will be clear to those of skill in the art, other alternatives may be envisioned and created, which do not depart from the scope or teaching of the present invention.

The invention claimed is:

1. A thermoacoustic device having an operating mode and a non-operating mode, the device comprising:
    a housing;
    a thermal core supported in the housing and having a first and a second surface, the thermal core including a first heat exchanger defining the first surface of the thermal core and a second heat exchanger defining the second surface of the thermal core;
    a main chamber in fluid communication with the first surface of the thermal core;
    a secondary multiplier chamber in fluid communication with the second surface of the thermal core;
    a working volume of a gaseous working fluid filling the main chamber, the multiplier chamber, and the thermal core at a pressure, an equilibrium pressure being defined as the pressure of the working volume of gaseous working fluid when the thermoacoustic device is in the non-operating mode;
    the main chamber including a first oscillating member, the first oscillating member being operable when the thermoacoustic device is in the operating mode to oscillate such that pressure in the main chamber is oscillated between a peak pressure greater than the equilibrium pressure and a minimum pressure less than the equilibrium pressure, a main pressure amplitude being defined as one half of the difference between the peak pressure and the minimum pressure in the main chamber;
    the secondary multiplier chamber including a second oscillating member, the second oscillating member being operable when the thermoacoustic device is in the operating mode to oscillate such that the pressure in the multiplier chamber is oscillated between a peak pressure greater than the equilibrium pressure and a minimum pressure less than the equilibrium pressure, a multiplier pressure amplitude being defined as one half of the difference between the peak pressure and the minimum pressure in the multiplier chamber;
    wherein the first and second oscillating members oscillate at substantially the same frequency and generally in phase; and
    the multiplier pressure amplitude is greater than the main pressure amplitude.

2. The thermoacoustic device according to claim 1, wherein the multiplier pressure amplitude is at least 2% greater than the main pressure amplitude.

3. The thermoacoustic device according to claim 1, wherein the multiplier pressure amplitude is at least 4% greater than the main pressure amplitude.

4. The thermoacoustic device according to claim 1, wherein the multiplier pressure amplitude is at least 6% greater than the main pressure amplitude.

5. The thermoacoustic device according to claim 1, further comprising a motor connected to the first oscillating member, the motor being operable to sinusoidally oscillate the first oscillating member such that the thermoacoustic device operates as a heat pump.

6. The thermoacoustic device according to claim 1, further comprising an alternator connected to the first oscillating member, the thermoacoustic device operating as a heat driven engine.

7. The thermoacoustic device according to claim 1, wherein the multiplier chamber is disposed within the main chamber.

8. The thermoacoustic device according to claim 7, wherein:
    the first heat exchanger comprises a hot heat exchanger;
    the second heat exchanger comprises cold head heat exchanger which forms one end of the housing, the cold head heat exchanger having an exterior heat exchange surface in thermal communication with an interior heat exchange surface;
    the thermoacoustic device further comprising;
    a support disposed in the housing adjacent the interior heat exchange surface of the cold head heat exchanger, the support defining a first passage between the multiplier volume and the interior heat exchange surface of the cold head heat exchanger and a second passage between the main volume and the interior heat exchange surface of the cold head heat exchanger, whereby the main volume and the multiplier volume are in fluid communication through the first and second passages;

a porous thermal storage element disposed in the first passage, the thermal storage element having a first surface and a second surface, the first surface being adjacent the interior heat exchange surface of the cold head heat exchanger and the hot heat exchanger being disposed adjacent the second surface of the thermal storage element.

9. The thermoacoustic device according to claim 1, wherein the first oscillating member comprises a piston, the main chamber including a flexure seal having a pair of ends and a flexure body extending therebetween, one end of the flexure seal being sealed to the piston and the other end being sealed to the first surface of the thermal core.

10. The thermoacoustic device according to claim 9, wherein the flexure seal comprises a bellows.

11. The thermoacoustic device according to claim 1, wherein the main chamber has a perimeter side wall and the oscillating member comprises a piston with a perimeter edge that slidably engages the side wall.

12. The thermoacoustic device according to claim 1, wherein the multiplier chamber has a perimeter side wall with a edge spaced from the second surface of the thermal core, the second oscillating member comprising a piston interconnected with the edge by a flexible seal.

13. The thermoacoustic device according to claim 1, wherein the second oscillating member comprises a piston, the multiplier chamber including a flexure seal having a pair of ends and a flexure body extending therebetween, one end of the flexure seal being sealed to the piston and the other end being sealed to the second surface of the thermal core.

14. The thermoacoustic device according to claim 1, wherein the first and second oscillating members are interconnected such that their displacements are identical.

15. The thermoacoustic device according to claim 14, wherein the first and second oscillating members are integrally formed.

16. The thermoacoustic device according to claim 1, wherein the housing comprises a pressure vessel, the main chamber and multiplier chamber being disposed in the pressure vessel, an additional volume of gaseous working fluid filling the pressure vessel.

17. The thermoacoustic device according to claim 1, further comprising a thermal storage element disposed between the first and second heat exchangers.

18. The thermoacoustic device according to claim 1, wherein;

the first heat exchanger comprises a plurality of generally parallel heat transfer elements disposed generally in a first plane and generally aligned in a first direction;

the second heat exchanger comprises a second plurality of generally parallel heat transfer element disposed in a second plane and generally aligned in a second direction, the second plane being generally parallel to the first plane and the second direction being at an angle to the first direction.

19. The thermoacoustic device according to claim 18, wherein the heat transfer elements of the first heat exchanger are fins and the heat transfer elements of the second heat exchanger are fluid filled tubes.

20. The thermoacoustic device according to claim 18, wherein the first and second directions are generally perpendicular.

* * * * *

UNITED STATES PATENT AND TRADEMARK OFFICE
CERTIFICATE OF CORRECTION

| | | |
|---|---|---|
| PATENT NO. | : 7,143,586 B2 | Page 1 of 1 |
| APPLICATION NO. | : 10/791497 | |
| DATED | : December 5, 2006 | |
| INVENTOR(S) | : Robert W.M. Smith et al. | |

It is certified that error appears in the above-identified patent and that said Letters Patent is hereby corrected as shown below:

Column 2, line 14, replace "engines" with --engines.--

Column 13, line 25, replace "freedom." with --freedom system.--

Column 14, line 1, replace "855filed" with --855, filed--

Signed and Sealed this

Seventh Day of August, 2007

JON W. DUDAS
*Director of the United States Patent and Trademark Office*